(12) United States Patent
Pessoa et al.

(10) Patent No.: US 9,817,677 B2
(45) Date of Patent: Nov. 14, 2017

(54) RULE BASED DATA DRIVEN VALIDATION

(75) Inventors: Carlos A. C. Pessoa, Redmond, WA (US); James T. Jacoby, Sammamish, WA (US); Julien J. Ellie, Issaquah, WA (US)

(73) Assignee: MICROSOFT TECHNOLOGIES LICENSING, LLC, Redmond, WA (US)

( * ) Notice: Subject to any disclaimer, the term of this patent is extended or adjusted under 35 U.S.C. 154(b) by 218 days.

(21) Appl. No.: 13/092,790

(22) Filed: Apr. 22, 2011

(65) Prior Publication Data

US 2012/0272221 A1 Oct. 25, 2012

(51) Int. Cl.
  G06F 9/44 (2006.01)
  G06F 15/18 (2006.01)
  G06F 17/00 (2006.01)
  G06N 5/02 (2006.01)
  G06F 15/16 (2006.01)

(52) U.S. Cl.
  CPC .................. *G06F 9/4433* (2013.01)

(58) Field of Classification Search
  CPC ............. G06F 11/3466; G06F 11/3409; G06F 11/3419; G06F 11/3476; G06F 11/3464
  USPC ...................................................... 717/727
  See application file for complete search history.

(56) References Cited

U.S. PATENT DOCUMENTS

| | | |
|---|---|---|
| 6,775,658 B1 | 8/2004 | Zothner |
| 6,915,454 B1 | 7/2005 | Moore et al. |
| 7,328,428 B2 * | 2/2008 | Baugher ........................ 717/124 |
| 7,353,248 B1 * | 4/2008 | Kirkpatrick ......... H04L 67/2819 707/999.1 |
| 7,574,496 B2 | 8/2009 | McCrory et al. |
| 7,636,764 B1 | 12/2009 | Fein et al. |
| 8,365,138 B2 * | 1/2013 | Iborra et al. .................. 717/104 |

(Continued)

OTHER PUBLICATIONS

Rimal, et al., "A Framework of Scientific Workflow Management Systems for Multi-Tenant Cloud Orchestration Environment", Proceedings of the 19th IEEE International Workshops on Enabling Technologies: Infrastructures for Collaborative Enterprises (WETICE), Jun. 28-30, 2010, IEEE Computer Society, Washington, DC, USA, pp. 88-93.

(Continued)

*Primary Examiner* — Li B Zhen
*Assistant Examiner* — Mohammad Kabir
(74) *Attorney, Agent, or Firm* — Vierra Magen Marcus LLP

(57) ABSTRACT

The technology provides for rule based data driven validation in which a rule engine identifies which rules are applicable to target data items of a target data object by their data types including any inherited data types. Additionally, a condition for a rule or a rule exemption is implemented also as a rule which is processed by the rule engine like any other rule. In one embodiment, a validation system includes an abstract rule store of rule instance data items which link to corresponding concrete rules which may be in different data formats. A corresponding rule provides access to rule logic which implements the corresponding rule. A rule engine and the abstract rule store may be accessed over a network by an application requesting validation of a target data object. Furthermore, in some examples, the data driven rule store can be implemented using the Microsoft .NET™ framework.

18 Claims, 13 Drawing Sheets

(56) References Cited

U.S. PATENT DOCUMENTS

| | | | |
|---|---|---|---|
| 2003/0191731 A1* | 10/2003 | Stewart | G06N 5/02 706/47 |
| 2004/0123101 A1* | 6/2004 | Rineer | G06F 21/645 713/161 |
| 2005/0005261 A1* | 1/2005 | Severin | 717/108 |
| 2006/0085459 A1* | 4/2006 | Noble et al. | 707/100 |
| 2007/0005786 A1 | 1/2007 | Kumar et al. | |
| 2007/0022119 A1* | 1/2007 | Roy | H04L 63/0245 |
| 2007/0067754 A1* | 3/2007 | Chen | G06F 11/0778 717/127 |
| 2008/0059897 A1 | 3/2008 | Dilorenzo | |
| 2008/0140601 A1* | 6/2008 | Mital et al. | 706/48 |
| 2008/0313120 A1* | 12/2008 | Kumbi et al. | 706/47 |
| 2009/0150859 A1* | 6/2009 | Cummings | G06F 9/4443 717/104 |
| 2009/0300578 A1* | 12/2009 | Neil | G06F 9/4443 717/104 |
| 2010/0042585 A1* | 2/2010 | Adler | 707/103 |
| 2010/0223593 A1* | 9/2010 | Eldridge | G05B 15/02 717/105 |
| 2010/0321722 A1* | 12/2010 | Koga | 358/1.15 |
| 2011/0238632 A1* | 9/2011 | Vandervort | G06F 17/30011 707/690 |
| 2012/0143801 A1* | 6/2012 | Tsuchida | G06N 99/005 706/12 |
| 2012/0203744 A1* | 8/2012 | Mercer et al. | 707/687 |

OTHER PUBLICATIONS

Simmhan, et al., "Building the Trident Scientific Workflow Workbench for Data Management in the Cloud", Proceedings of the 2009 Third International Conference on Advanced Engineering Computing and Applications in Sciences (ADVCOMP 2009), Oct. 11-16, 2009, IEEE Computer Society, Washington, DC, USA, pp. 41-50.

Tanaka, et al., "Service Supervision Patterns: Reusable Adaption of Composite Services", Cloud Computing, First International Conference, CloudComp 2009, Munich, Germany, Oct. 19-21, 2009, Lecture Notes of the Institute for Computer Sciences, Social Informatics and Telecommunications Engineering, vol. 34, Issue 5, Springer, pp. 147-163.

".Net Framework", Wikipedia, the free encyclopedia [online], Feb. 13, 2002 [retrieved on Feb. 10, 2011]. Retrieved from the Internet<URL:http://en.wikipedia.org/wiki/.NET_Framework>, 9 pages.

"Reflection Overview", .NET Framework 1.1, msdn [online], [retrieved on Feb. 10, 2011]. Retrieved from the Internet: <URL:http://msdn.microsoft.com/en-us/library/f7ykdhsy(d=printer,v=vs.71).aspx>, 2 pages.

* cited by examiner

RULE BASED DATA DRIVEN VALIDATION

BACKGROUND

Data from an application can be validated against a number of validation criteria. For example, data can be checked to verify that the application is running within standard parameters. For example, in a game application, the number of levels or the amount of game points to buy upgrades can be validated. Additionally, data entered into a computer system uses certain formats to be processed properly by the system. Software executing on received data has limits on data values provided for certain data items under different conditions. Data validation may be used to verify data is being transformed within boundary values or in accordance with conditions.

In the past, validation based on data was performed as part of the code of the application for which data was being validated. A change to the validation logic resulted in recompilation of source code or updates to application copies executing on user computers. The same validation logic for a data item, for example the format of a name, applicable to multiple applications, for example game applications which run on the same gaming platform, is duplicated. Furthermore, validation code increases the executable size of an application.

SUMMARY

The technology provides rule based data driven validation which separates validation logic from the application which is validating the data, thus letting the application and the validation logic evolve independently. An application may send a request including a target data object with one or more target data items for validation. In many embodiments, one or more rules applicable to a target data item for validation are identified based on the data type of the data item including any base or inherited data types. Additionally, a validation result data object may be returned to the application for the target data object of the request. In some embodiments, the validation result data object provides an overall status of validation for the target data object and a validation result status for each target data item with respect to each rule applied to it.

The technology provides a computer implemented method for rule based data driven validation. The method comprises receiving over a communication network a target data object in a validation request from an executing software application, identifying one or more target data member items of the target data object based on stored data type definitions, and identifying a data type and any inherited data type for the one or more target data item members. The method further comprises identifying one or more rules applicable to each target data item based on a target data identifier associated with each applicable rule having a same data type or an inherited data type of the target data item. The identified one or more applicable rules are executed subject to rule execution criteria, and a validation result data object is returned to the software application.

The technology provides an embodiment of a data driven validation system comprising one or more processors and a memory. An abstract rule store is stored in the memory and links one or more rules instance data items to one or more corresponding rules stored in a concrete rule store. Each rule instance data item comprising a target data identifier identifying a data type of a target data item processed by its respective linked one or more corresponding rules. A concrete rule provides access to computer instructions for executing or implementing rule logic. A plurality of concrete rule stores in different data formats can access the same abstract rule store. An example of a data format is extensible markup language (XML). Some other examples of data formats are a database format such as structured query language (SQL), a text data format or a .NET™ attributes format.

The system further comprises a validation software interface executing on the one or more processors for receiving a validation request comprising a target data object from an executing software application, the target data object including one or more target data items of the object to be validated. A rule engine for accessing the one or more rule instance data items is communicatively coupled to the validation software interface to receive the validation request. The rule engine executes on the one or more processors and identifies one or more rule instance data items based on the target data identifier which are applicable to the one or more target data items. The rule engine executes rule logic of the corresponding one or more rules linked to the identified one or more rule instance data items.

The technology also provides an embodiment of one or more computer readable storage media having stored thereon processor executable instructions for implementing a method for a rule based data driven validation. The method comprises filling target data member items of a target data object with data values to be validated. A validation result data object is instantiated to receive the aggregation of individual rule results applied to respective target data member items of the target data object, and a validation request is sent with the target data object over a communication network to a validation system. The method further comprises receiving the validation result object back from the validation system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
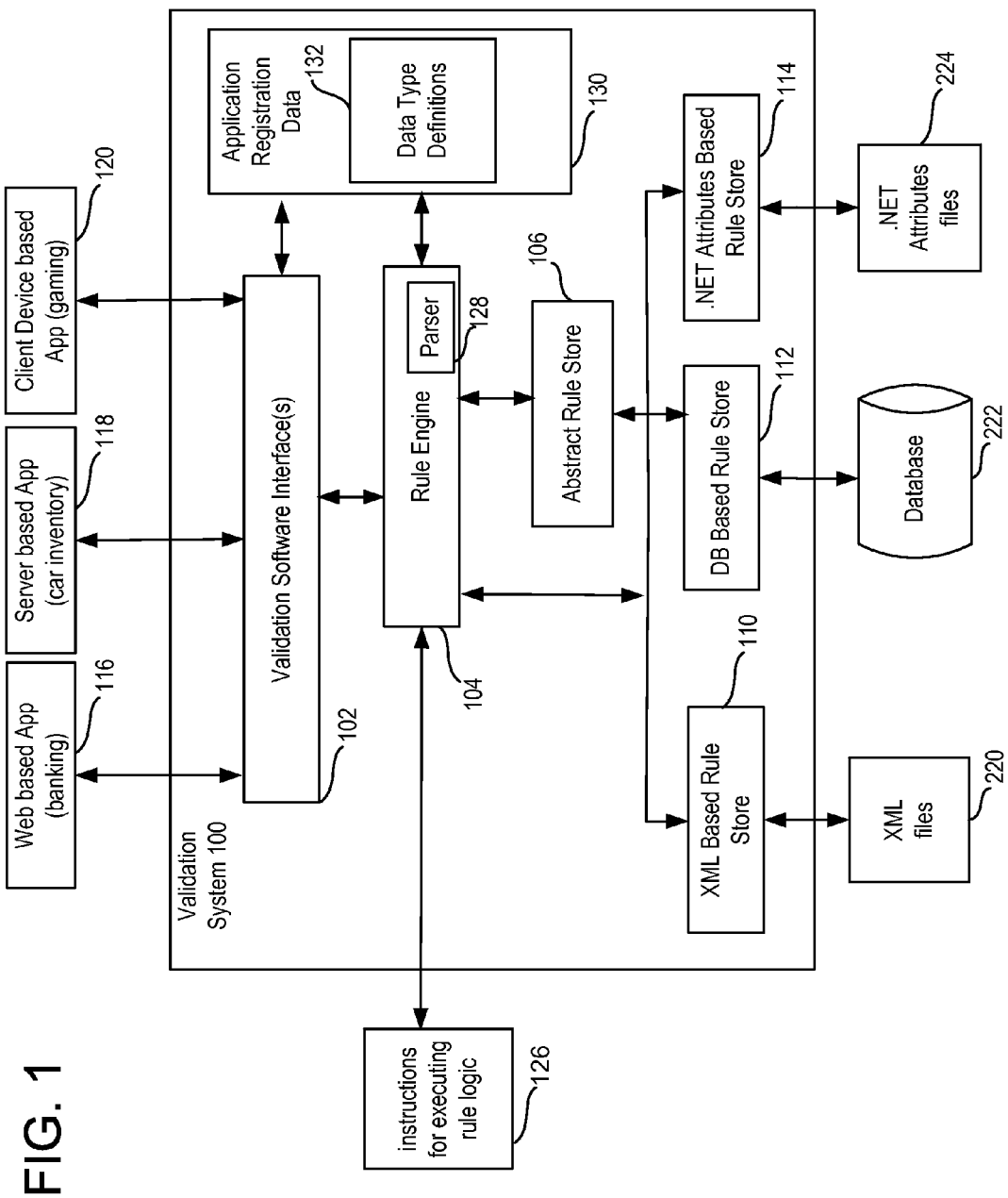
FIG. 1 is a block diagram of an embodiment of a data driven validation system from a software architectural perspective in accordance with the technology.

Some embodiments for rule based data driven validation are described in which rules are identified as applicable to target data items to be validated based on a data type and any base or inherited data type of each target data item. One or more target data items may be passed at the same time for validation in a target data object. Results for each applicable rule for each target data item may be aggregated and returned with an overall status for the validation request in a validation result data object.

Some embodiments of a data driven validation system comprise an abstract rule store linking to one or more concrete rule stores storing rules in one or more different data formats. The abstract rule store provides a canonical representation of a rule. A canonical representation of a rule is a pre-defined representation made available to developers, for example via a class definition, so rules may be formatted accordingly. In some embodiments, the canonical representation of the rule comprises a data item called a rule instance. In other words, a rule instance is an abstract version of a rule providing linking information to a corresponding concrete version of the rule which provides access to computer executable instructions which implement the logic of the corresponding rule.

The rule instance includes a target data identifier and in many cases a rule identifier. A target data identifier represents a data type of data to be processed by the linked or associated rule. In some examples, the target data identifier is defined as a member of a class, for example the member "hair_color" of the class "avatar." Hair_color may be an enumerated type in which colors correspond to integer values. A rule with an integer data parameter may apply the same logic to any integer passed to it. A rule instance having avatar.hair_color as a target data identifier applies only to the data of the type avatar.hair_color, not any integer.

In some embodiments, the concrete version of a rule also includes a target data identifier, and a rule engine can locate linked abstract and concrete rule versions by matching their target data identifiers and rule identifiers. In other embodiments, a pointer to a memory location of the concrete rule version may also be stored in the abstract rule store version.

Each concrete rule store is associated with a specific application type, for example a banking application or a car inventory application or a gaming application like Fable® for XBOX® Live or any of a number of gaming applications supported by a gaming platform like XBOX® Live. A software interface such as an application programming interface identifies the requesting application type to the rule engine and further identifies which concrete rule store has the rules for that application type.

The rule engine identifies any links or references to rule logic in concrete versions of the rule. An example of rule logic is a method called and its input parameters. The rule engine executes any method called and returns the results to the calling application. The logic for rules may use system functions. Some examples of such system functions are a numeric range rule or a string length function. Virtual machine environments allow a developer flexibility in choice of language used to define rule logic. Some examples of virtual machine environments are virtual machine platforms like Java™ based virtual machines or Microsoft's .NET framework. The methods may also be defined by a developer in a language supported by the virtual machine such as a version of C, Visual Basic® or Java. The rule logic in supported languages is compiled by the virtual machine to a form which may be interpreted by a runtime executable such as one implemented by the rule engine.

FIG. 1 is a block diagram of an embodiment of a data driven validation system 100 from a software architectural perspective in accordance with the technology. Some examples of executing applications requesting data validation are illustrated as a web based banking application 116, a server based car inventory application 118, and a gaming application 120 executing on a client computing device. Some examples of a client device is a mobile device like a smartphone or laptop computer or a personal computer. The applications 116, 118, 120 communicate with a rule engine 104 via a validation software interface 102 of the validation system 100.

As illustrated in some examples discussed below, the software interface 102 provides one or more definitions of methods and data formats for uploading rules to the validation system and accessing the rule engine 104. For example, the validation software interface 102 may provide a basic rule class definition, a rule instance class definition, and class definitions for a validation result object and a validation engine including methods for making validation requests.

When an application uploads its concrete rule store and abstract rule store, the software interface 102 identifies and stores data in an application registration data store 130 for use in processing a validation request. Some examples of such stored data are the type of application, identifying data for locating the abstract rule store and the concrete rule store for each type of application, and identifying data for locating any executable software uploaded in instructions 126 for processing rules in the application's concrete rule store. An example of executable software uploaded for processing rules in the concrete rule store is a database manager for accessing and processing rules stored in a database format like those for example of database formatted rule store 112. Additionally, such executable software may include a software interface such as an application programming interface through which the database manager receives data from the rule engine 104 which has been retrieved from the abstract rule store 106 and any returned data such as validation results which the rule engine 104 may format for return to a requesting application via the validation software interface 102.

The data type definitions 132 identify the data types of target data objects and their target data items which the application submits for validation. For example, the car inventory application 118 provides a car class data object definition including member target data items such as, for example, a model year, a model name, a color, number of airbags and the like. The rule engine 104 also has access in memory to the application registration data 130 which it uses in processing validation requests. For example, the rule engine 104 can look up in the registration data 130 with which concrete rule store the application is associated.

In this embodiment, the rule engine 104 is communicatively coupled to receive a validation request including a target data object from the validation software interface 102. Again, the target data object includes one or more target data items to be validated. For processing the request, the rule engine 104 has access in memory to the abstract rule store 106 and one or more concrete rule stores organized in different data formats 110, 112, 114. The abstract rule store links one or more rule instance data items to one or more corresponding rules stored in a concrete rule store. As mentioned above, each rule instance data item in the abstract rule store comprises a target data identifier which identifies a data type of the data processed by its linked one or more corresponding rules. The rule engine 104 searches the target data identifiers of the abstract rule store 106 and identifies one or more rule instances which are applicable to a target data item of the received target data object based on the target data identifier. In many instances, the rule instance data item includes a rule identifier which identifies the name or other identifying criteria of the corresponding concrete rule. The rule engine causes the execution of the computer instructions 126 for executing the rule logic of the identified corresponding concrete rule.

The rule engine 104 accesses the data type definitions 132 for the target data items of the target data object to be validated. For example, based on the data type definitions, for an entry value of "2007" in a target data item having a data type of testapp.car.car_model.year, the rule engine 104 searches the target data identifiers for a match with testapp.car.car_model.year. (Testapp indicates the type of application so the car object defined for this type of car inventory application 118 is accessed rather than for another application type in this example.) Additionally, if the target data object also includes "Mustang" in a target data item having a data type of testapp.car.car_model.name, the rule engine 104 searches the target data identifiers for a match with testapp.car.car_model.name.

In some embodiments, the rule engine identifies one or more rule instance data items based not only on the exact data type of the target data item but also on a base data type or inherited data type of the target data item. For example, a target data item may have the exact data type testapp.car.uscar_modelinfo.name. The class uscar_modelinfo is defined to be of the type car_model. Therefore, the rule engine 104 identifies the base or inherited data type of car_model for uscar_modelinfo target data items. Rule instance data items for testapp.car.car_model.name are identified and applied for testapp.car.uscar_modelinfo.name as well. In some examples where only rules of an inherited data type are applicable, a rule instance may be defined with only a target data identifier as the rule engine 104 locates the rule instance data items with target data identifiers for the inherited data type and rule identifiers for the corresponding concrete rules applicable for the inherited or base type.

The abstract rule store can link or be associated to concrete rules in various data formats. In one example, a data format of the abstract rule store is extensible markup language (XML). As illustrated, a concrete rule store, XML based rule store 110, also uses XML as a data format for organizing its concrete rules in XML files 220. The rule engine 104 may include a parser 128 for parsing the canonical format of the abstract rule store to identify rule identifiers and target data identifiers and other data which may be stored in a rule instance data item. For example, where XML is used for the abstract rule store, the parser 128 may be an XML parser. In another example, an application may be tied to an older database of rules 222 which have been uploaded to the validation system 100, as part of a database (DB) (e.g. SQL) rule store 112. XML versions of the rules in the abstract rule store 106 link to the rules stored in the format of the database rule store 112 via the rule instance rule identifiers or the target data identifiers or both. Another illustrated example of a data format used by a concrete rule store which provides access to rule logic is a .NET attributes formatted rule store 114 which stores rules in this example in files 224. An application's associated concrete rule store may be implemented in text files or other formats such as the examples 112 or 114 as chosen by the application's developer. As mentioned above, the application may upload during the registration process executable software for processing rules in the chosen data format for its concrete rule store. Besides the example of a database manager mentioned above, a text parser for the particular format chosen is another example of such executable software.

After the execution of the applicable rules, the rule engine 104 returns validation result data to the software interface 102 for sending to the requesting application 116, 118, 120. In one example, the rule engine 104 aggregates the results for each rule executed for each target data item in the target data object of the request in a validation result data object along with an overall indicator of the validation success or failure for the received target data object.

Some embodiments provide data driven validation in the context of a .NET Framework which is a software framework originally developed for the Microsoft Windows® operating systems but which can be used with other operating systems as well. The .NET Framework provides language interoperability for several languages, for example versions of C, Java and Visual Basic by providing a virtual machine environment. A Common Language Infrastructure (CLI) may translate code in different languages to a Common Intermediate Language (CIL). The CLI is implemented using a Common Type System (CTS) and a Common Language Runtime (CLR). The CLR provides a virtual machine environment to relieve application developers from programming to a specific central processing unit (CPU) and handles system tasks such as memory management and garbage collection. The CTS has a specification which defines all data types and programming constructs supported by the CLR and the mechanisms for their interaction. The CTS allows the .NET Framework to support the exchange of types and object instances between libraries and applications written using any conforming .NET language.

The .NET Framework also provides class libraries. A Base Class Library (BCL) is part of a Framework Class Library (FCL). The BCL provides a number of functions to languages using the .NET Framework. An example of such functions are file reading and writing, graphics rendering, database interaction, and XML document manipulation. The BCL includes a subset of the entire class library, and includes the core set of classes that serve as the basic application programming interface (API) of the Common Language Runtime (CLR).

A validation framework or system based on the .NET framework may provide a library of basic rules which may be embodied in assembly files which perform functions on input data. Some examples of such basic library rules for strings are a string equality rule, a string length rule, a string match count rule, a string match rule and a UTF8 String Byte Length Rule. Another example with respect to numbers is a numeric range rule. With respect to .NET Framework collections, some examples of basic rules are a collection contains a value rule, a collection count rule, a collection equality rule, a collection match rule, a collection intersect rule, a collection modification rule, a collection sum rule and a collection uniqueness rule. Some other examples of basic rules are a file exists rule, a file length rule, a filename length rule, an image height rule, an image width rule and a type conversion rule.

An assembly comprises one or more files, at least one of which includes a manifest which has metadata for the assembly. Each of these assemblies can be accessed by their metadata via a .NET library function known as Reflection. The System.Reflection namespace of the .NET Framework contains types that retrieve information about assemblies, modules, members, parameters, and other entities in managed code by examining their metadata. System.Reflection.Assembly may be used to define and load assemblies, load modules that are listed in an assembly manifest, and locate a type from this assembly and create an instance of it. System.Reflection.PropertyInfo discovers information such as the name, data type, inherited type, declaring type, reflected type, and read-only or writable status of a property, and to get or set property values. System.Reflection.MemberInfo provides some of the same functions as PropertyInfo inherits MemberInfo. For example, both include a DeclaringType function that gets the class that declares the member or property and GetType which gets the current type of the member or property instance. System.Reflection.ParameterInfo discovers information such as a parameter's name, data type, whether a parameter is an input or output parameter, and the position of the parameter in a method signature.

Figure 2:
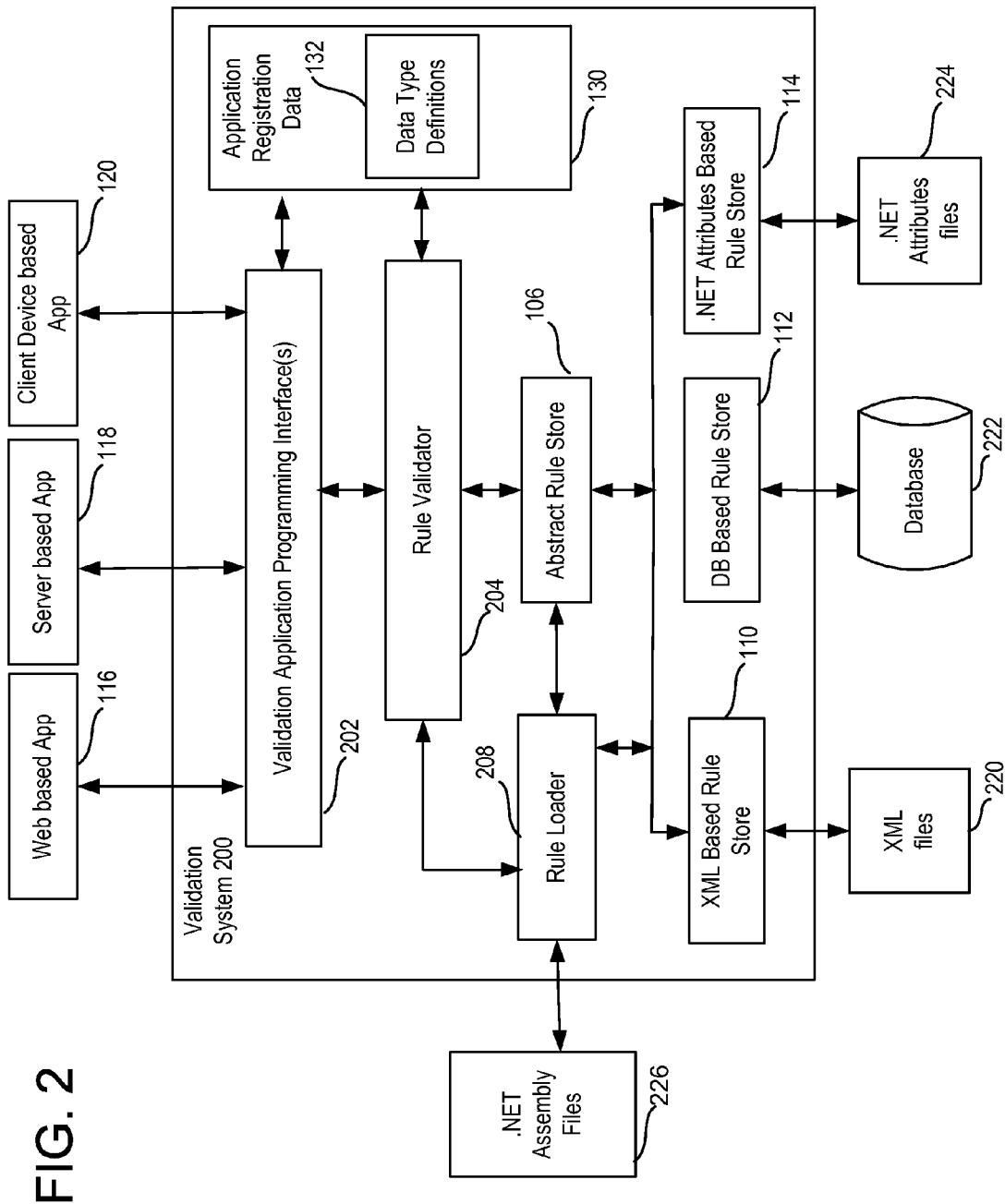
FIG. 2 is a block diagram of another embodiment of a rule based data driven validation system using Microsoft's .NET framework.

With the discussion above about the .NET Framework for reference, FIG. 2 is discussed which presents a block diagram of another embodiment of a data driven validation system 200 using an embodiment of the .NET framework. In this embodiment, the one or more validation software interface(s) 102 are embodied as one or more application programming interfaces 202 for receiving validation requests. In this embodiment, the rule engine 104 comprises a rule validator 204 and a rule loader 208 which work together to identify rules using the abstract rule store 106 and to locate and execute rules applicable to a validation request.

The rule validator 204 receives a .NET object including a class identifier and a property identifier for identifying each target data item in the target data object embodied as a .NET object. In this embodiment, a target data identifier of a rule instance in the abstract rule store comprises a class identifier and a property identifier. The rule validator may use one or more Reflection functions of the .NET framework to search the class and property identifiers of rule instances in the abstract rule store to locate applicable rules for items of the target data object. For example, functions of System.Reflection.PropertyInfo or System.Reflection.MemberInfo may be used. The rule validator 204 uses the rule identifier or the target data identifier or both to link to rules in the requesting application's concrete rule store.

As shown in examples below, the linked corresponding concrete rule references one or more .NET Assembly files 226 which include instructions for implementing the rule's logic such as one or more methods to be called. The rule validator 204 calls the rule loader 208 which may use the one or more Reflection functions of the .NET framework again to search the metadata of the .NET Assembly files 226 to find an identified rule.

In other embodiments, a concrete rule store may be uploaded, and the rule engine parses the concrete rule store and translates the rules to the data format of the abstract rule store, for example XML. In these examples, the abstract rule store may be considered to have a common intermediate format. In these examples, the rule validator 204 parses the rules instances in the abstract rule store for the rule logic and parameters as they are identified in the abstract rule store rules in the common intermediate format.

Figure 3:
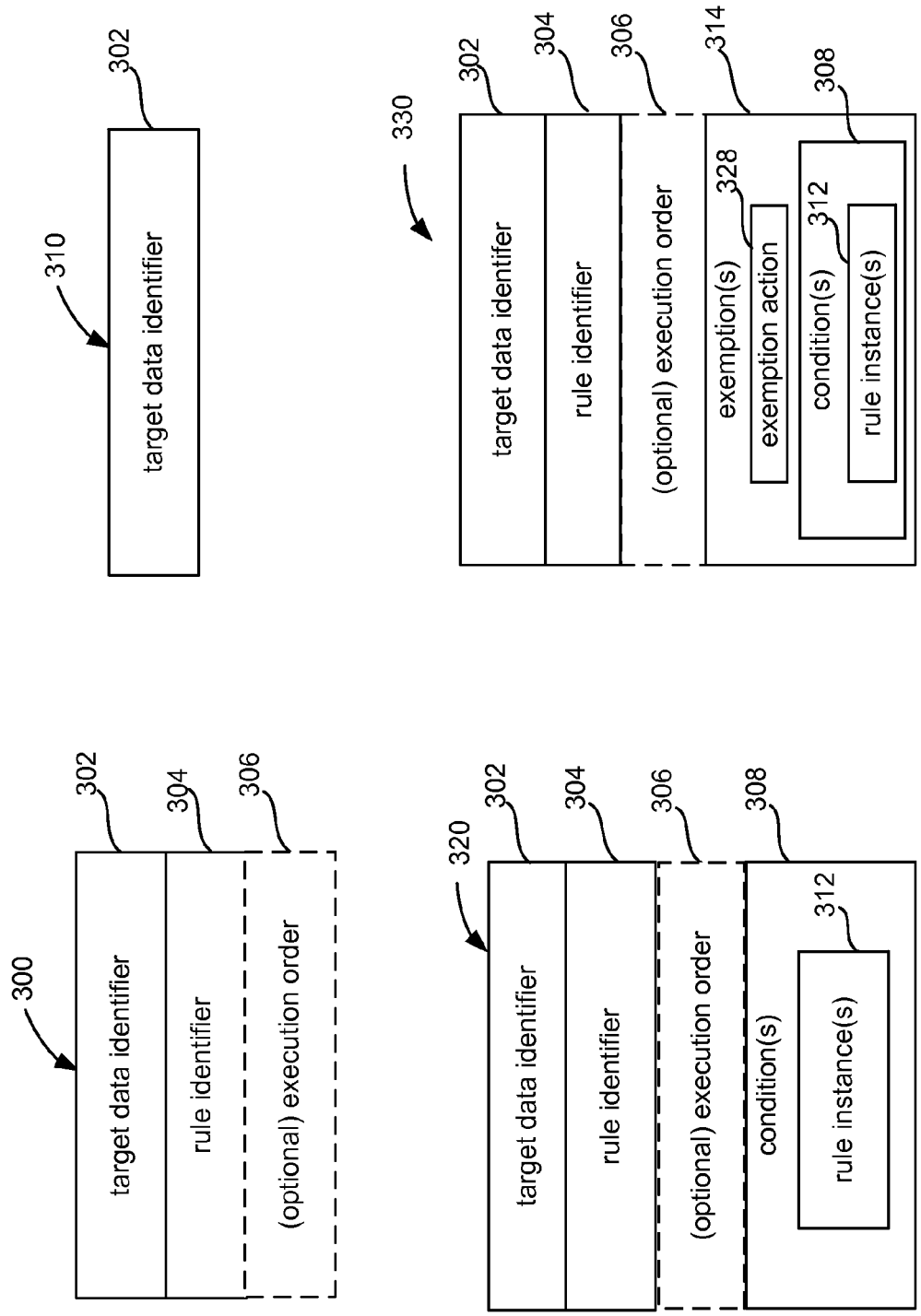
FIG. 3 illustrates some embodiments of rule instance data items stored in an embodiment of an abstract rule store which may be searched to identify applicable rules.

FIG. 3 illustrates some embodiments of rule instance data items stored in an embodiment of an abstract rule store which the rule engine 104 or the rule validator 204 may search to identify applicable rules. Data item 300 comprises for example a target data identifier 302 and a rule identifier 304. In one example, the target data identifier 302 may be a member of a class. For example, the class may represent a product like an operating system product or a car, and the member data field represents an aspect of the product like its number of doors or a version number. In .NET framework examples, the target identifier may include a class identifier and a property identifier. For example, a class identifier may be application.car and a property identifier may be application.car.numdoors for the number of doors on the car. The rule identifier 304 identifies the rule in the requesting application's concrete rule store which applies. For example, the rule identifier, e.g. "NumDoorsRule" may be a string which can be compared with rule identifiers in the application's concrete rule store for a match in order to locate the applicable rules.

Optionally, there may be an execution order data field 306 which may be set to define the order in which the corresponding rule associated or linked to the rule instance is to be executed among the other rules in the concrete rule store according to a criteria. The order may be determined for each rule in a group of rules or a rule set for a target data item. In another example, an order may be determined with respect to individual rule sets for a plurality of target data items. For example, one rule set for one target data item is executed before the rule set for another target data item. The rule engine 104 may group rules by their execution order fields, for example implemented as an integer, and execute them in that order, stopping the flow when the execution of a group of rules contains a validation failure. A default execution order value may be zero to indicate a rule is not tied to a particular order of execution.

The following example illustrates a rule instance as it may be formatted in the abstract rule store for the validation system using the .NET framework.

```
<RuleInstance RuleId="Sample.CollectionCountRule_MaxValue" >
    <Target ClassId="SampleNamespace.GameInfo"
        PropertyId="GameLevels" />
</RuleInstance>
```

The rule identifier for this rule instance is "Sample.CollectionCountRule_MaxValue. The target data identifier includes ClassId which is a class identifier for SampleNamespace.GameInfo and PropertyId which is a property identifier for a member of that class, GameLevels.

The concrete rule store version of this rule in XML is also formatted as a rule instance but also includes an identifier for locating the rule logic for executing the rule.

```
<RuleInstance RuleId="Sample.CollectionCountRule_MaxValue"
    ErrorMessage="A game cannot have more than {0} levels.">
  <Target ClassId="SampleNamespace.GameInfo"
      PropertyId="GameLevels" />
  <Rule AssemblyId="ValidationFramework.BasicRules.dll"
      ClassId="Microsoft.ValidationFramework.BasicRules.
      CollectionCountRule">
    <Parameters>
      <RuleParameter Key="MaxValue" Value="64" />
    </Parameters>
  </Rule>
</RuleInstance>
```

The validation criteria for this rule is that the number of game levels may not exceed 64 as indicated by the MaxValue parameter. The rule instance determines if the input value received in the input variable SampleNamespace.GameInfo.GameLevels is valid by applying a rule from a basic rules library, ValidationFramework.BasicRules.dll, which is stored in one or more .NET Assembly files 226 which can be accessed via an identifier called AssemblyId. Furthermore the rule within the library is further identified by a class identifier ClassId to give the rule within the Assembly as Microsoft.ValidationFramework.BasicRules.CollectionCountRule. The rule instance inserts the validation criteria via a maximum value parameter, 64 in this example, for the CollectionCountRule. If the number of game levels is exceeded, a return value from a function call, e.g. a pass/fail flag value, may be returned as in a function call and the error message, "A game cannot have more than 64 levels."

Below is another example of an abstract version of a rule represented as a rule instance and further including an Error Message linking to a rule (see below) in a concrete rule store for validating a software tool version number:

```
<RuleInstance    RuleId="ToolVersionRule" ErrorMessage="This
    version of the tool is not current.">
  <Target ClassId="Tool" PropertyId="ToolVersion" />
</RuleInstance>
```

Below is another example of a rule in a concrete XML rule store for validating a software tool version number:

```
<Rule RuleId="ToolVersionRule"
    <Target ClassId= "Tool" PropertyId= "ToolVersion"/>
    AssemblyId="ValidationFramework.BasicRules.dll"
    ClassId="NumericRangeRule">
  <Parameters>
    <RuleParameter Key="MinValue" Value="2010" />
  </Parameters>
</Rule>
```

In this example, a software tool version is tested to see whether it was at least released after 2010 or not. The version, "ToolVersion" is represented as a member referred to as a property of a class "Tool". The rule uses a numeric range rule of a basic rules library stored in one or more .NET Assembly files 226 accessible by the AssemblyID to determine whether the software version satisfies the validation criteria. This approach of using validation rules to check versions allows for the application to not have to include versioning and update logic in each copy of the application.

In another illustrative example, the concrete rule store may be embodied as a database rule store 112 having access to a database of rules 222. The rule engine 104 may load a database manager provided when the application registered its rule stores. The database manager may have an application programming interface through which the rule engine can communicate each target data identifier and rule identifier from each applicable abstract rule instance data item. The database manager inserts the received target data identifier and rule identifier in a query and executes the query to locate the concrete version of the rule which is referenced in the database. In the case of the .NET framework, the database manager may communicate to the rule validator 204 or the rule loader 208 directly a .NET Assembly file identifier for the rule logic for the rule and any parameters for the rule logic.

As mentioned above in the example of where there are only applicable rules of an inherited data type, a rule instance may be defined with only a target data identifier as the rule engine 104 locates the rule instance data items with target data identifiers for the inherited data type and rule identifiers for their corresponding concrete rules. Rule instance data item 310 presents an example of such a data item in which target data identifier 302 tags the target data item for recursion or for execution of a rule for an inherited data type.

For an illustrative example, below is the data type definition stored in the data type definitions data store 132 for a target data object of "Car" submitted for validation by a car inventory application 118.

```
Class Car
{
  Public int MaxSpeed {get; set;}
  Public int NumDoors {get; set;}
  Public CarModel USCarModelInfo {get; set;}
  Public CarModel BrazilCarModelInfo {get; set;}
}
Class CarModel
{
  Public string Name {get; set;}
}
```

Below are an example of tagging USCarModelInfo and an example of tagging BrazilCarModelInfo for application of a rule applicable to their base or inherited type CarModel.

```
<RuleInstance>
<Target ClassId= "TestApp.Car" PropertyId= "USCarModelInfo" />
<RuleInstance/>
<RuleInstance>
<Target ClassId= "TestApp.Car" PropertyId= "BrazilCarModelInfo" />
<RuleInstance/>
```

The rule engine 104 or rule validator 204 identifies each of BrazilCarModelInfo and USCarModelInfo to be declared to be of type CarModel. A concrete rule applicable to TestApp.CarModel.Name which limits the name length to 16 characters is also applied to TestApp.USCarModelInfo.Name and TestApp.BrazilCarModelInfo.Name.

In embodiments of the technology, each condition may be implemented or represented as a rule instance with a target data identifier as in the example below. The validation system 100 allows conditions to be attached to rule instances to determine when the rule engine 104 is to run the rule instance or when the rule instance is to be skipped or altered in execution. A condition may be implemented as one or more rules, which allows conditional logic to represent very complex real world situations, for example tax exemptions in a tax form, and at the same time is very simple to implement in the validation system 100, 200 as the conditional logic is executed by the rule engine 104, 204, 208 like any other rule.

Rule instance data item 320 is an example of an abstract representation of a conditional rule. The execution of the corresponding concrete rule identified by the target data identifier 302 and the rule identifier 304 is effected by a rule identified in a rule instance 312 of the condition 308. In some examples, the target data identifier of the condition rule instance 312 identifies a target data identifier different than the target data identifier 302 of the rule instance 320. The condition data item 308 alerts the rule engine 104 or the rule validator 204 to execute the corresponding rule of the condition 308 identified in the rule instance 312 for determining whether to execute the conditional rule identified by the target data identifier 302 or the target data identifier 302 and the rule identifier 304. The rule instance data item 312 which implements the condition is accessible by and processed for execution by the rule engine 104 or the rule validator 204 like any other rule instance data item in the abstract rule store 106. Furthermore, the corresponding concrete rule to the rule instance 312 is accessed and processed by the rule engine 104 or rule validator 204 and rule loader 208 like any other corresponding concrete rule.

Below is an example of how the abstract rule store 106 may represent a conditional rule like in the rule instance data item 320. A class type for a Car includes two members, referred to as properties in this example of a MaxSpeed and a Model.Year. (Model.Year is a member of the class Model which is a member of the class Car).

```
<RuleInstance RuleId="MaxSpeedRule" ErrorMessage="The max
    speed of the car is invalid!">
  <Target ClassId="TestApp.Car" PropertyId="MaxSpeed"/>
  <Conditions>
    <RuleInstance>
      <Target ClassId=" TestApp.Car " PropertyId="Model.Year"/>
    </RuleInstance>
  </Conditions>
</RuleInstance>
```

From the target data identifier of the rule instance between the XML tags of the "Conditions", the conditional rule validates whether Car.Model.Year satisfies a condition for executing the corresponding MaxSpeedRule in the concrete rule store. The corresponding MaxSpeedRule in this example includes the rule of the condition which is executed first to determine if the MaxSpeedRule applies.

Below is an example of how a concrete XML rule store 110 may represent a conditional rule in the .NET framework validation system embodiment.

```
<RuleInstance RuleId="MaxSpeedRule" ErrorMessage="The max
speed of the car is invalid!">
  <Target ClassId="TestApp.Car" PropertyId="MaxSpeed"/>
  <Rule AssemblyId="ValidationFramework.BasicRules.dll"
ClassId="BasicRules.NumericRangeRule">
    <Parameters>
      <RuleParameter Key="MinValue" Value="0"/>
      <RuleParameter Key="MaxValue" Value="140"/>
    </Parameters>
  </Rule>
  <Conditions>
    <RuleInstance>
      <Target ClassId=" TestApp.Car " PropertyId="Model.Year"/>
        <Rule      AssemblyId="ValidationFramework.BasicRules.dll"
ClassId="BasicRules.NumericRangeRule">
        <Parameters>
          <RuleParameter Key="MinValue" Value="1990"/>
          <RuleParameter Key="MaxValue" Value="2000"/>
        </Parameters>
      </Rule>
    </RuleInstance>
  </Conditions>
</RuleInstance>
```

For model years of cars between 1990 and 2000, the speed a car could go was from 0 to 140 miles per hour.) In other years, the speed boundaries or limits are different. The condition for 1990-2000 model year cars is represented as a rule for the model year. The BasicRules.NumericRangeRule identified in the AssemblyId is executed first with respect to the Model.Year. The pass or fail validation result indicates whether the condition was satisfied or not which indicates whether the MaxSpeedRule is to be executed or not.

To evaluate if a condition is satisfied at runtime, the rule validator 204 uses the target data identifier, for instance, <Target ClassId="car" PropertyId="Model.Year"/>, in each rule instance between the Conditions begin and end tags to retrieve the value that it will run through that rule to see if the condition is satisfied. A pass result for the condition rule, for example the model year is 1995, triggers execution of the rule to which the conditions are attached with the designated parameters. So if the car model year is 1995, the "MaxSpeedRule" executes with minimum and maximum speed parameters between 0 and 140 miles per hour.

As mentioned above, in some embodiments, concrete rules may be translated to a data format like XML in the abstract data store. In these embodiments, the rule logic is identified in the rules of the abstract rule store 106 thus eliminating the need to access the concrete rule stores during runtime of a validation engine.

Rule instance data item 330 represents a rule exemption 314 associated with a rule instance which may cause an exemption action 328 to be executed with respect to the rule. An example of an exemption action is skipping the rule or overriding parameters of the rule. For example, a maximum or minimum value for a parameter may be overridden. A condition 308 implemented as a rule instance 312 data item linking to a corresponding concrete rule determines whether the rule exemption 314 applies. By being able to process exemptions and conditions as rules, the rule effected does not have to be recompiled or modified. Exemptions and conditions may be added or removed separately.

Below is an example of a rule exemption embodied in a concrete XML rule store. The exempted rule is referenced here by TargetRuleId="MaxSpeedRule". In this example, the exemption action is to skip a maximum speed rule for a car being inventorized by the car inventory application 118, if as indicated in the rule instance in the conditions, the model name is "Experimental."

```
<RuleExemption TargetRuleId="MaxSpeedRule"
    ExemptionAction="Skip">
  <Conditions>
    <RuleInstance>
      <Target ClassId=" TestApp.Car" PropertyId="Model.Name"/>
      <Rule AssemblyId="ValidationFramework.BasicRules.dll"
                ClassId="BasicRules.StringRule">
        <Parameters>
          <RuleParameter Key="Equals" Value="Experimental"/>
        </Parameters>
      </Rule>
```

```
    </RuleInstance>
  </Conditions>
</RuleExemption>
```

The rule validator 204 calls the ValidationFrameworkBasicRules.StringRule which performs a string comparison on the TestApp.Car.Model.Name property to see if there is a match ("equals") with the string "Experimental". If so, the MaxSpeedRule is not executed or is skipped for any speed data entered. If there is not a match, a fail flag from the basic library string rule function indicates the model is not an experimental model, and the maximum speed rule is executed for validating speed data entered.

In the example, below, instead of skipping the rule, the exemption action is to override parameters of the rule with new parameter values.

```
<RuleExemption TargetRuleId="MaxSpeedRule"
    ExemptionAction="OverrideParameters">
  <Parameters>
    <RuleParameter Key="MaxValue" Value="250"/>
  </Parameters>
  <Conditions>
    <RuleInstance>
      <Target ClassId="this" PropertyId="Model.Name"/>
      <Rule AssemblyId="ValidationFramework.BasicRules.dll"
          ClassId="BasicRules.StringRule">
        <Parameters>
          <RuleParameter Key="Equals" Value="Z4"/>
        </Parameters>
      </Rule>
    </RuleInstance>
  </Conditions>
</RuleExemption>
```

In this example, a value for the model name of "Z4" triggers the maximum speed rule, MaxSpeedRule, to be executed with the maximum value parameter, MaxValue, overridden to be 250 miles per hour as opposed to 140. In the example of a network of used car dealers, a rule for a car model with different features can be entered into the system by adding a rule exemption or a condition to a centralized set of business rules rather than updating all the copies of the inventory application being run at each dealership.

For illustrative purposes, the method embodiments below are discussed in the context of the systems of FIG. 1, FIG. 2 or both.

Figure 4A:
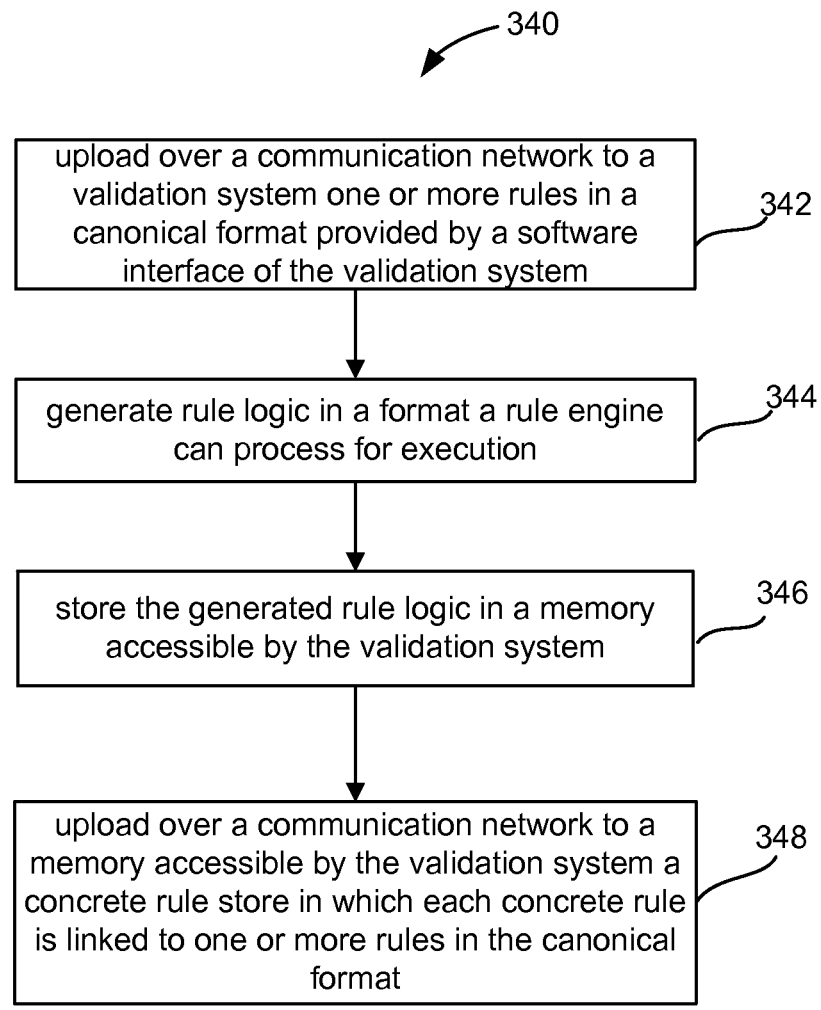
FIG. 4A is a flowchart of an embodiment of a computer implemented method for initializing a rule based data driven validation system with rule data from a perspective of an application.

FIG. 4A is a flowchart of an embodiment of a computer implemented method 340 for initializing a rule based data driven validation system with rule data from a perspective of an application. Software executing on a processor in a computer system accessible to the validation system 100 in step 342 uploads over a communication network to a validation system one or more rules in a canonical format, a format based on a basic rule type, e.g. a class definition, provided by a software interface 102, 202 of the validation system 100, 200. In many embodiments, the software which generates the rules is separate from the application although they may share compatible data types. This separation allows the rules to be updated separately without effecting the application or applications of the same type especially after they have been released and are in general use.

In step 344, software generates rule logic in a format a rule engine 104 or rule loader 208 can process for execution, and stores the generated rule logic in a memory accessible by the validation system in step 346. For example, the rule logic may be compiled into a virtual machine code which may be interpreted at runtime. For example, rule making software for one of the applications 116, 118, 120 communicating with a validation system 200 implemented in a .NET framework may compile code into the common intermediate language (CIL) and store it in a .NET Assembly file 226 which will be in a format that a .NET framework runtime initiated by the rule validator 204 can process into an executable form. The metadata of the Assembly file 226 can be searched to identify the rule logic, for example by the "AssemblyID" discussed in the examples above.

The rule making software uploads in step 348 over a communication network a concrete rule store for the type of the application to a memory accessible by the validation system. Application copies with the same name share the same application type, and applications which run on the same platform may also share the same application type in other examples. For example, a rule set may apply to a certain class of games which run on a gaming platform like XBOX Live. Each concrete rule is linked to one or more rules in the canonical format. In some embodiments, each rule in the concrete rule store includes a target data identifier and a rule identifier which can be matched against those of the canonical formatted rules and their inherited types.

In some embodiments like those of FIGS. 1 and 2, when the software interface 102, 202 of the validation system 100, 200 receives the upload of each type of rule store, it associates the rule store with the application type, for example in a lookup table like the application registration data 130 which the rule engine 104 or the rule validator 204 can read.

Uploading a new rule or changing a rule can be performed using similar steps. A new rule would have any custom logic compiled and stored, a concrete rule uploaded to the application's concrete rule store and a rule instance data item uploaded to the application type's abstract rule store. For a rule change, depending on what is changing, e.g., rule logic or a definition of a target data identifier, one or more of the rule logic, the concrete rule or the abstract rule may be changed.

Rule stores can have sub-rule stores so hierarchies of which applications are effected by a rule change can be managed.

Figure 4B:
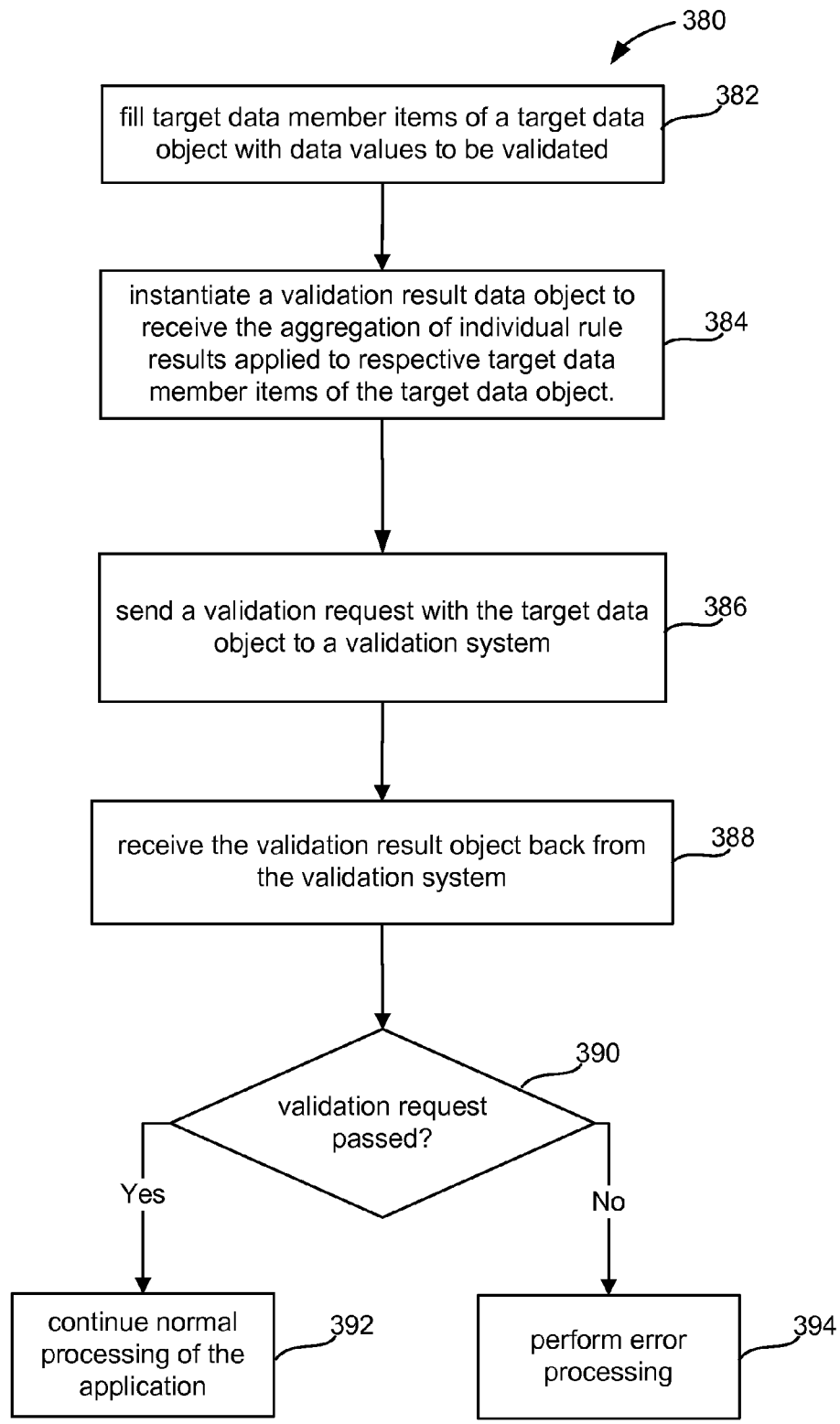
FIG. 4B is a flowchart of an embodiment of a computer implemented method for rule based data driven validation based on rule instance data items from a perspective of an application making a validation request.

FIG. 4B is a flowchart of an embodiment of a computer implemented method for rule based data driven validation based on rule instance data items from a perspective of an application making a validation request. In step 382, the application fills target data member items of a target data object with data values to be validated, e.g. user input entries. In the case of a .NET object, each target data item may be described by a class and a property.

A target data object allows the validation request to send a whole set of data at the same time for validation. For example, a car class data object as in the examples above may be sent with data item members such as Car.Model.Year, Car.Model.Name, Car.Numdoors, Car.NumAirBags and the like. Validation results which identify the result for each rule applied to each data value provided in the target data object is useful to an application. For example, if a car object is passed in to the validation system and there are several rules that match a Car class and other rules that match a ModelInfo class (see above example definition of Car and ModelInfo classes), which happens to be referenced by a property in the Car class, all those rules will be executed. The validation system 100 or framework 200 returns a collection of results, where each result has enough information to allow the calling application to map each result to the appropriate data that is associated with it.

In some embodiments, the application instantiates a validation result data object as in step 384 to receive the aggregation of individual rule results applied to the respective target data member items of the target data object provided by the validation system as the validation results for the target data object. An example of a definition of such a validation result data object is as follows:

```
public enum Validation Status {Passed, Failed}
public class ValidationResult
{
  public ValidationStatus Status {get; private set;}
  public IEnumerable<RuleValidationResult> Failures {get; private set;}
  public IEnumerable<RuleValidationResult> Results {get; private set;}
}
public class RuleValidationResult
{
  public ValidationStatus Status {get; set;}
  public RuleInstance RuleInstance {get; set;}
  public string ValueId {get; set;}
  public object Value {get; set;}
}
```

In this example, the validation results are aggregated into a validation result data object of the ValidationResult class, which defines an overall status of the validation, Status, and provides access to the individual results of each rule instance. Each one of those individual results map back to the respective value that the rule instance validated through the use of a string that defines the hierarchical path to get to that property from the object that was passed in. For example, if the path reported by a rule validation result is "USCarModelInfo.Name", it means that it's referring to the USCarModelInfo property in the object that was passed in, and then to the Name property in that USCarModelInfo property. Such a mapping enables clients of the validation system to map the results back to individual elements, for example individual user interface (UI) elements. The application may maintain a lookup table linking such strings to their associated UI controls, and then use it when processing validation results to do the appropriate mapping. For instance, this allows highlighting a failed UI element to red, or the user to double click on a validation failure within a list to jump to the UI element.

In step 386, the application, sends a validation request with the target data object over a communication network to the validation system. In the ValidationResult example above, the rules that failed are provided in a "Failures" collection. The "Results" collection includes all the rule results, passed and failed. In other embodiments, a validation result data object may be sent as a parameter in the call to the validation system itself.

Below is an example of a class object including methods or functions for invoking the Validation Engine to find all the rules that apply to the data values supplied in the target data object for validation.

```
public class ValidationEngine
{
  public ValidationEngine {RuleStore ruleStore};
  public ValidationEngine {RuleStore ruleStore, IObject
Inspector  object Inspector, IRuleSelector ruleSelector};
  public ValidationResult ValidateObject (object value);
  public ValidationResult ValidateObject  (object value,
IDictionary<string, object> context);
  public ValidationResult ValidateProperty (Type propertyHolderType,
string propertyName, objectpropertyValue);
  public  ValidationResult  ValidateProperty  (Type
propertyHolderType,  string propertyName, objectpropertyValue,
IDictionary<string, object> context);
}
```

In step 388, the application receives the validation result object back from the validation system and determines in step 390 whether the target data of the validation request has passed or failed. If the request has passed, the application continues its normal processing in step 392, and if the request has not passed, the application performs error processing in step 394 based on the failure. The example below illustrates a call to the validation system to validate the target data object "car" including,

```
// Validating a Car object
ValidationResult result = valEngine.ValidateObject(car);
foreach (RuleValidationResult item in result.Failures)
{
  // Visit each rule instance failure and perform error processing
}
```

Passing a target data object with members allows for a deep or recursive validation mechanism. The target data object, for example a class object, with particular members having filled values for validation is passed at the same time to the validation engine rather than individually passing each object member for validation. The validation engine uses or traverses the class definition for the object in the data type definitions 132 to identify its target data members, their data types and their base or inherited data types. For example, an applicable rule for a target data member of the target data object class may be identified based on a definition of a parent class which is a base class for the target data object. In other examples, rules applicable to a target data member are identified based on the target data item being a subtype, for example a subclass, of a type, for example a class, defined in the target data object. The traversing or recursing of data type definitions can be in more than one direction for finding data types with a relationship to the target data object. In some embodiments, applicable rules are identified based upon matches between target data identifiers of rule instance data items and the data types and inherited data types of the identified target data members of the target data object.

Figure 5A:
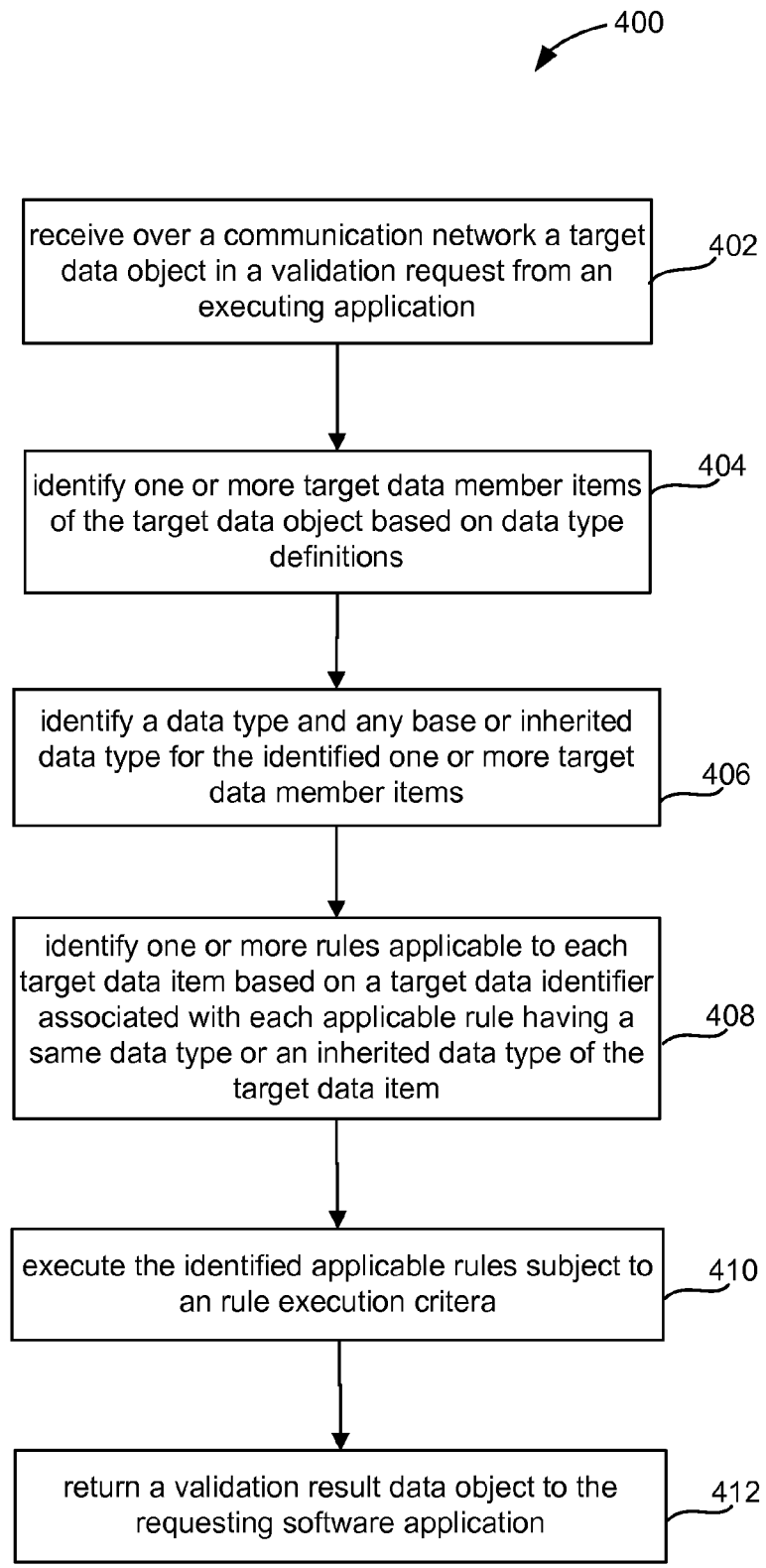
FIG. 5A is a flowchart of another embodiment of a computer implemented method for rule based data driven validation from a validation system perspective.

FIG. 5A is a flowchart of an embodiment of a computer implemented method for rule based data-driven validation from a validation system perspective. For illustrative exemplar contexts, references are made to the system embodiments discussed above. The rule engine 104 receives in step 402 over a communication network a target data object in a validation request from an executing application. The rule engine 104 identifies one or more target data item members of the target data object in step 404 based on data type definitions, for example stored in the data type definition data store 130, and identifies in step 406 a data type and any base or inherited data type for the identified one or more target data member items.

For example, in a received data object from the application, each parameter received is predefined to be of a certain type. An example of a data type may be a basic type like integer or string or it may be a higher level type such as a class member like Car.CarModel where Car is the class type and CarModel is a member of the class type Car. In a car inventory data entry system for example, input data from the application for a data field entry of car model has selections of USCarModel, BrazilCarModel, GermanyCarModel, etc. If a user selects USCarModel, the data entered is defined as type USCarModelInfo. Type USCarModelInfo is defined as being of type CarModel which is a class having members such as Name and Year so USCarModelInfo inherits the type of the class CarModel as an inherited data type as well. Therefore, USCarModelInfo has members such as Name and Year too.

In .NET framework embodiments, the rule validator 204 uses one or more Reflection functions to identify inherited data types and hence rules of inherited data types which are applicable to the target data too. In the .NET framework example, one or more Collection functions may also be executed by the rule validator 204 to walk through the data type hierarchy of the target data object.

In step 408, the rule engine 104 identifies one or more rules applicable to each target data item based on a target data identifier associated with each applicable rule having a same data type or an inherited data type of the target data item. For example, in the embodiments of FIGS. 1 and 2, rule instances applicable for the target data item are identified by searching the target data identifiers of rule instance data items in the abstract data store 106 for a match to the data type or inherited data type of a target data item.

In the case of rule instances for example, a target data identifier may have a string, of type USCarModelInfo.Name. Additionally, there may be rule instances with target identifiers indicating CarModel.Name as the applicable target data. Through the data type definition path for USCarModelInfo.Name, the rule engine 104 identifies the inherited data types for the data item too, and identifies through the target identifiers any rules applicable for CarModel.Name as well as USCarModelInfo.Name. The engine 104 applies the rules for both CarModel.Name and USCarModelInfo.Name to the target data item USCarModelInfo.Name. In some examples, the rule engine 104 searches the rule instance identifiers for rules applicable to the classes USCarModelInfo, CarModel and Car as a whole. For example, a user may have defined a rule that a string in any of these classes has a string length limit rather than defining a rule instance for each data item of type string in one of these classes.

In step 410, the rule engine 104 causes execution of the identified applicable rules subject to any rule execution criteria. For example, if there are data values provided for the optional execution order data field in the rule instance identifier, the rule engine 104 determines the order and executes the rules in that order. Furthermore, if there are exemptions 314 and conditions 308, the rule designated in the associated condition data item is executed first as it triggers the execution or exemption action in the execution of the rule with which it is associated.

In the system embodiments above, the engine 104 or the rule validator 204 links via the identified rule instance data items to the one or more identified corresponding concrete rules. As mentioned above, in some embodiments, if the abstract rule store is embodied with translations of the concrete rule stores, the abstract rule store identifies the rule logic 126, 226 for the rule engine 104 or the rule loader 208 to cause to execute in its own rule instance data items.

A validation result data object in step 412 is returned to the requesting software application. The validation result data object may aggregate the validation results for each rule applied to each target data item in a format accessible by the application for determining individual rule validation results for each target data item of the target data object. The validation result data object may also provide an overall validation status for the request.

Figure 5B:
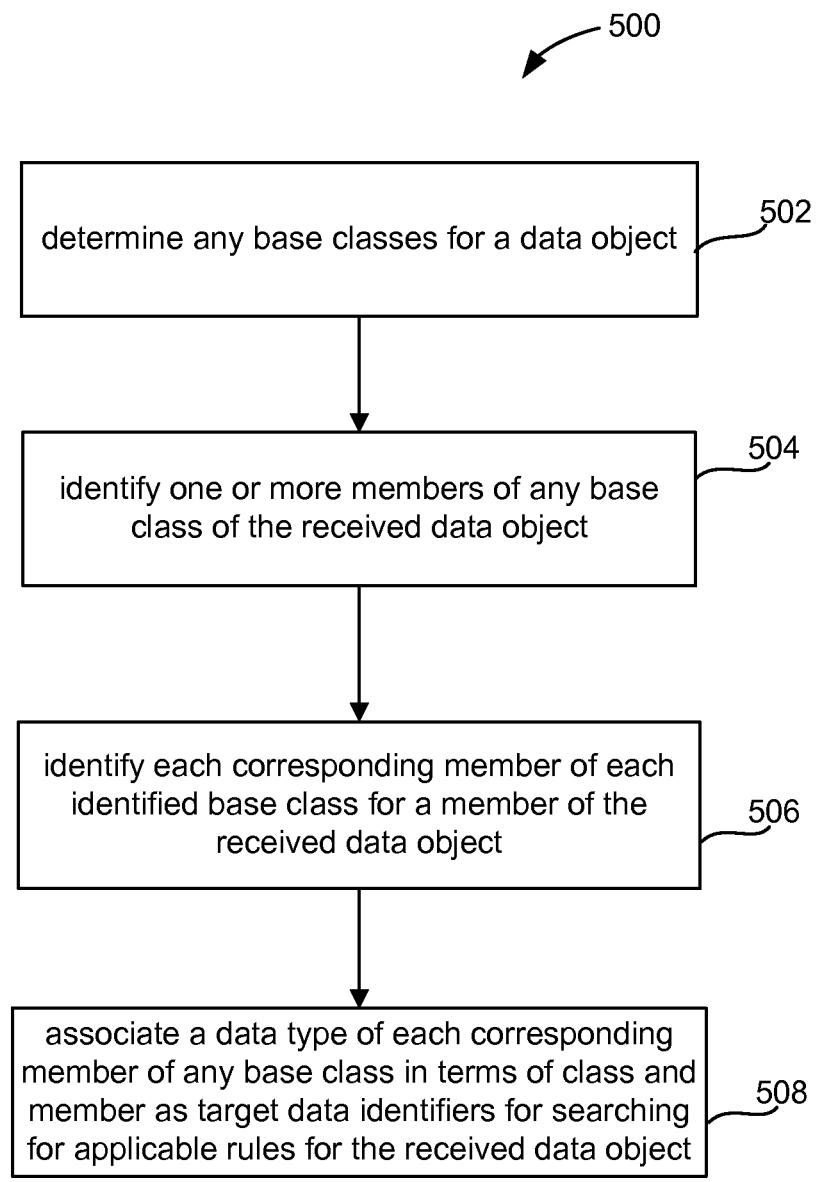
FIG. 5B is a flowchart of an embodiment of a process for identifying target data identifiers for any base or inherited class members to search for a member of a class.

FIG. 5B is a flowchart of an embodiment of a process for identifying target data identifiers for any base or inherited class members to search for a member of a class. The process of FIG. 5B may be performed when the rules are first uploaded or updated or when a target data object is received and may be used to implement steps 404 and 406. In this embodiment, the data type of a data object to be processed is some type of class, e.g. Car or CarModel. A target data object may be a class object with no base classes, but there may be cases where the target data object is defined in terms of another class so it has a base or inherited class. Additionally, a target data member of a target data object or one of its base classes may also be defined in terms of another class, e.g. USCarModelInfo is defined to be of the class CarModel. The process of FIG. 5B may be performed for a target data object or a target data item using the data type definitions, which would include class definitions. For example, computer executable instructions for implementing the process may be called over and over with new input data.

In step 502, the rule engine 104 or the validation software interface 102 identify any base classes for a data object by traversing the data class definitions. The one or more members of any of the base classes of the received data object are identified in step 504. In step 506, each corresponding member of each identified base class is identified for a member of the received data object. For example, CarModel.Name and CarModel.Year are identified for USCarModelInfo.Name and USCarModelInfo.Year respectively. In step 508, a data type of each corresponding member of the base class in terms of class and member are associated as target data identifiers for searching for applicable rules for the received data object. The process of FIG. 5B may be performed for each class data object encountered including for base class objects identified as traversing data definitions to find all the target data identifiers that apply for each target data member item of the target data object.

Figure 6A:
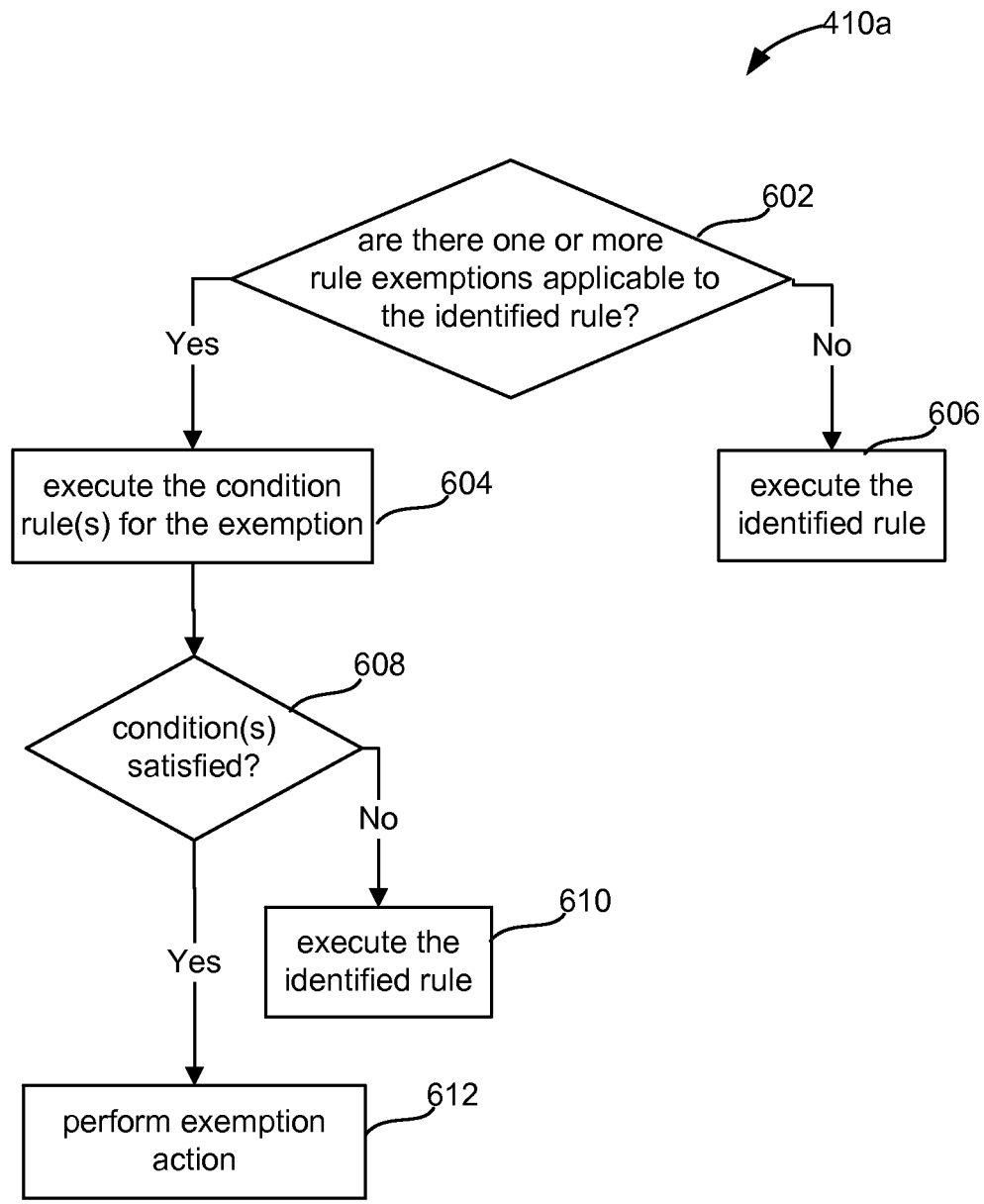
FIG. 6A is a flowchart of an embodiment of a process for executing a rule exemption to a rule as part of executing a rule in accordance with rule execution criteria.

FIG. 6A is a flowchart of an embodiment of a process 410a for executing a rule exemption to a rule as part of executing a rule in accordance with rule execution criteria. The rule engine 104 determines whether there are one or more rule exemptions applicable to an identified rule in step 602. If not, the identified rule is executed in step 606. If there are one or more rule exemptions, the rule engine 104 executes the one or more condition rules for the exemption in step 604 like any other rule. If the rule returns a failed status, the one or more conditions for the exemption are determined to not be satisfied in step 608, the identified rule executes in step 610 with its regular parameters. If the one or more conditions for the exemption in step 608 are determined to be satisfied, the rule engine performs the exemption action 612. One example of an exemption action is skipping execution of the rule.

Figure 6B:
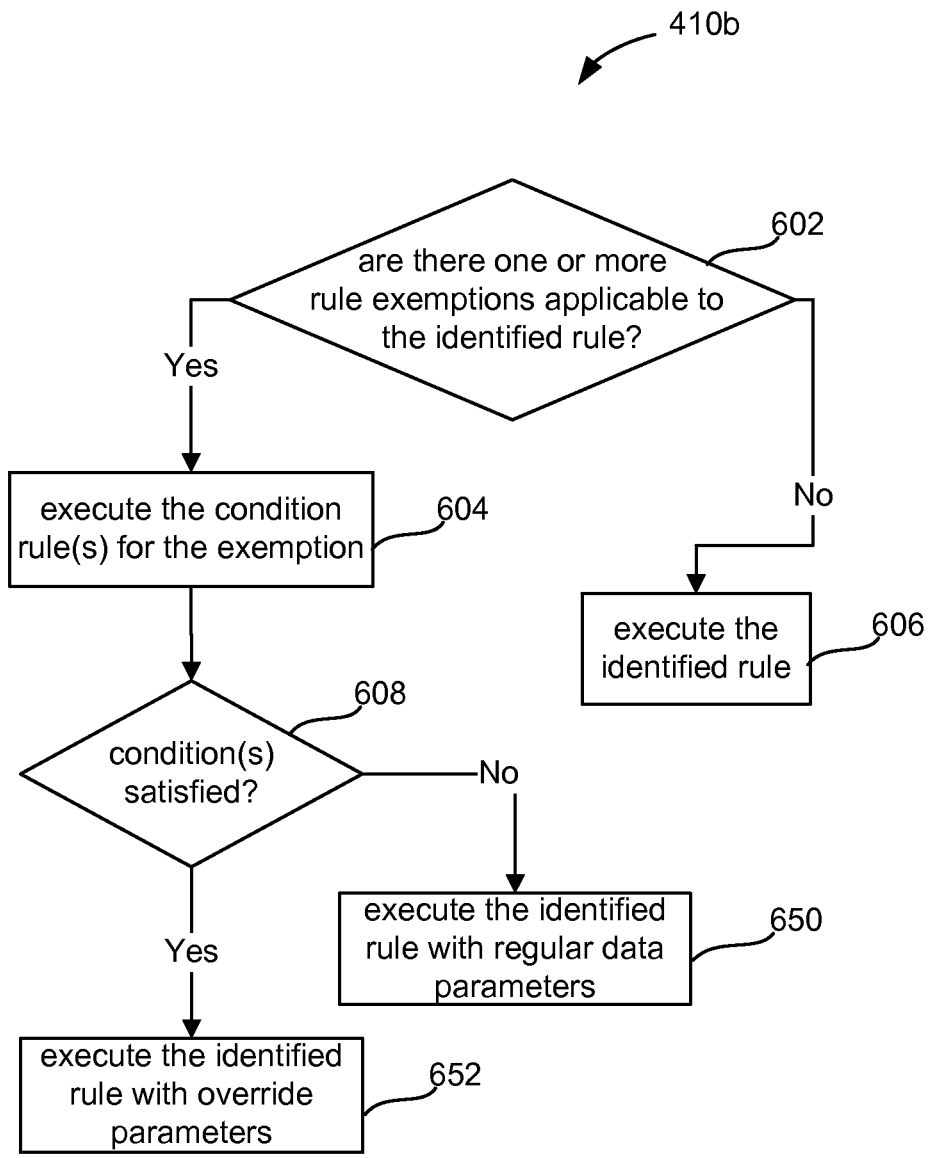
FIG. 6B is a flowchart of an embodiment of a process for executing an example of a rule exemption rule with override parameters.

FIG. 6B is a flowchart of an embodiment of a process 410b for executing an example of a rule exemption rule with override parameters. Another example of an exemption action is overriding the parameters of the rule and executing the rule. In the example of FIG. 6B, if the one or more conditions for the exemption in step 608 are determined to be satisfied, the rule engine 104 alters execution of the identified rule by executing the identified rule with the overridden parameters in step 652. If the one or more conditions for the exemption in step 608 are determined not to be satisfied, the exemption does not apply and the rule engine 104 executes the identified rule with regular data parameters 650.

Figure 6C:
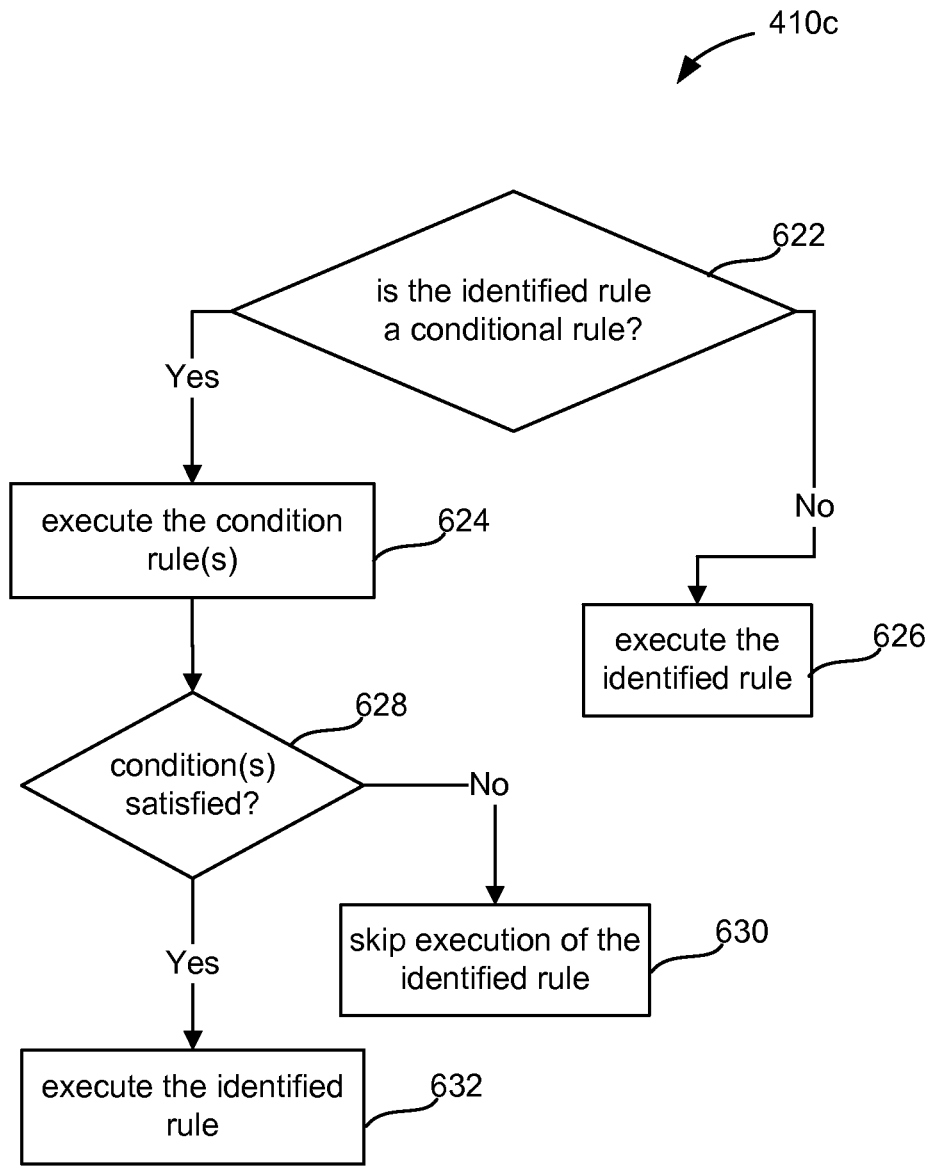
FIG. 6C is a flowchart of an embodiment of a process for executing a conditional rule as part of executing a rule in accordance with rule execution criteria.

FIG. 6C is a flowchart of an embodiment of a process 410c for executing a conditional rule as part of executing a rule in accordance with rule execution criteria. The rule engine 104 determines whether the identified rule is a conditional rule in step 622. In the embodiment of FIG. 1 for example, the rule engine 104 identifies whether there is a condition data item 308 associated with a rule instance or not. The condition data item 308 identifies a condition rule which in the case of a conditional rule is a rule other than the identified rule. A condition rule is executed like any other rule, before the identified rule to see if the identified rule is to be executed. If the identified rule is not a conditional rule, the identified rule is executed in step 626. If there are one or more condition rules, the rule engine 104 executes the one or more condition rules in step 624. If the conditions are determined to not be satisfied in step 628, e.g. the one or more condition rules return failure results, the identified rule is not executed or in other words, its execution is skipped in step 630. If the one or more conditions in step 628 are determined to be satisfied, e.g. the one or more condition rules return a pass status, the rule engine executes the identified rule in step 632.

Figure 7:
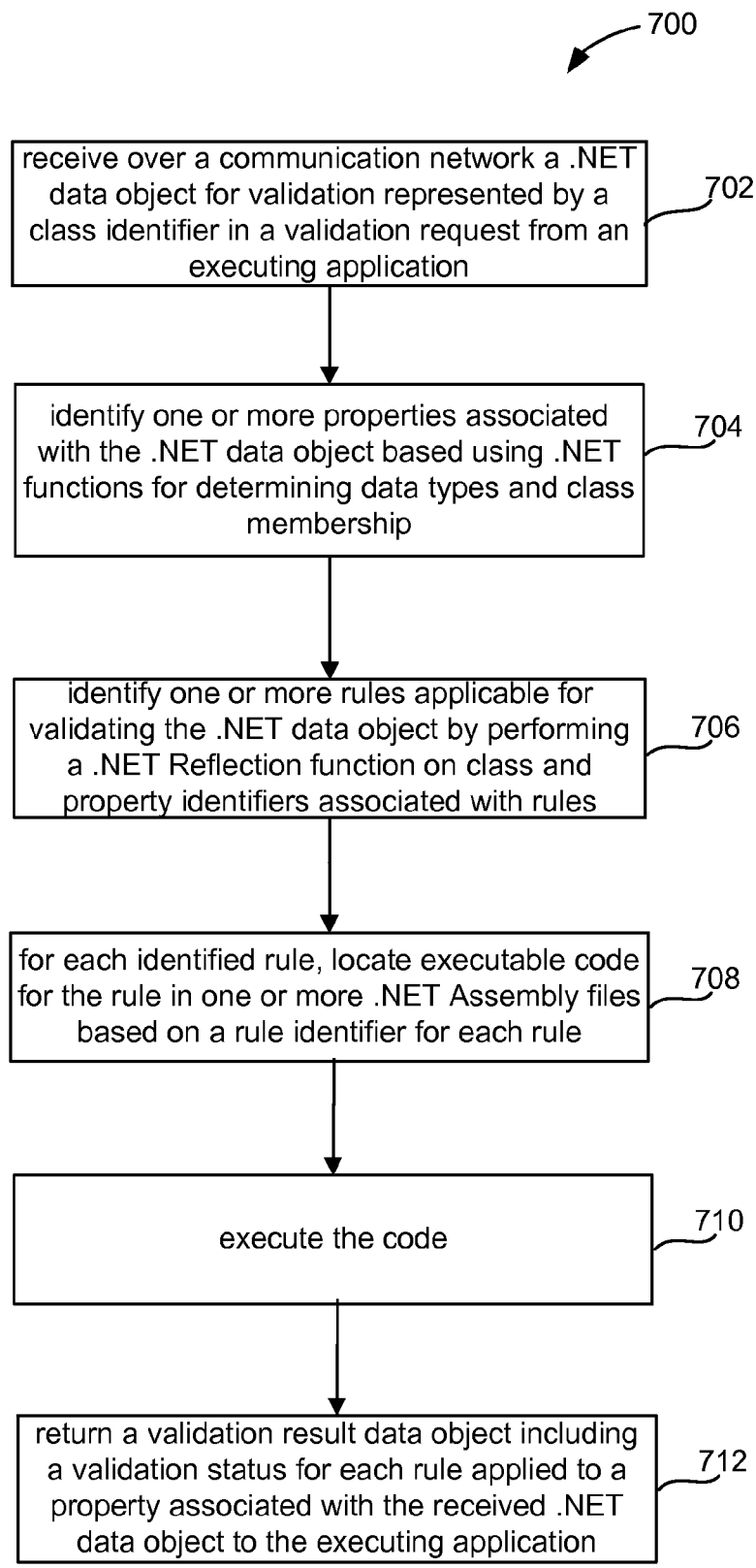
FIG. 7 is a flowchart illustrating an embodiment of a rule based method for validating data using the .NET framework.

FIG. 7 is a flowchart illustrating an embodiment of a rule based method for validating data using the .NET framework. For illustrative purposes, the method embodiment of FIG. 7 is discussed in the context of the system of FIG. 2. In step 702, the rule validator 204 receives over a communication network a .NET data object for validation represented by a class identifier in a validation request from an executing application. The rule validator 204 identifies in step 704 one or more properties associated with the .NET data object using .NET functions for determining data types and class membership. Some examples of such functions were described above such as .NET Reflection functions like PropertyInfo, MemberInfo, GetType and DeclaringType. Additionally, one or more .NET Collection functions may also be used to identify related classes and properties. One or more rules are identified in step 706 as applicable for validating the .NET data object by performing a .NET Reflection function on class and property identifiers associated with rules. For each identified rule, in step 708, the rule validator 204 and the rule loader 208 locate executable code for the identified rule in one or more .NET Assembly files based on a rule identifier for each rule and the rule loader 208 causes execution of the code in step 710. The rule validator 204 returns in step 712 a validation result data object including a validation status for each rule applied to a property associated with the received .NET data object to the executing application.

Figure 8:
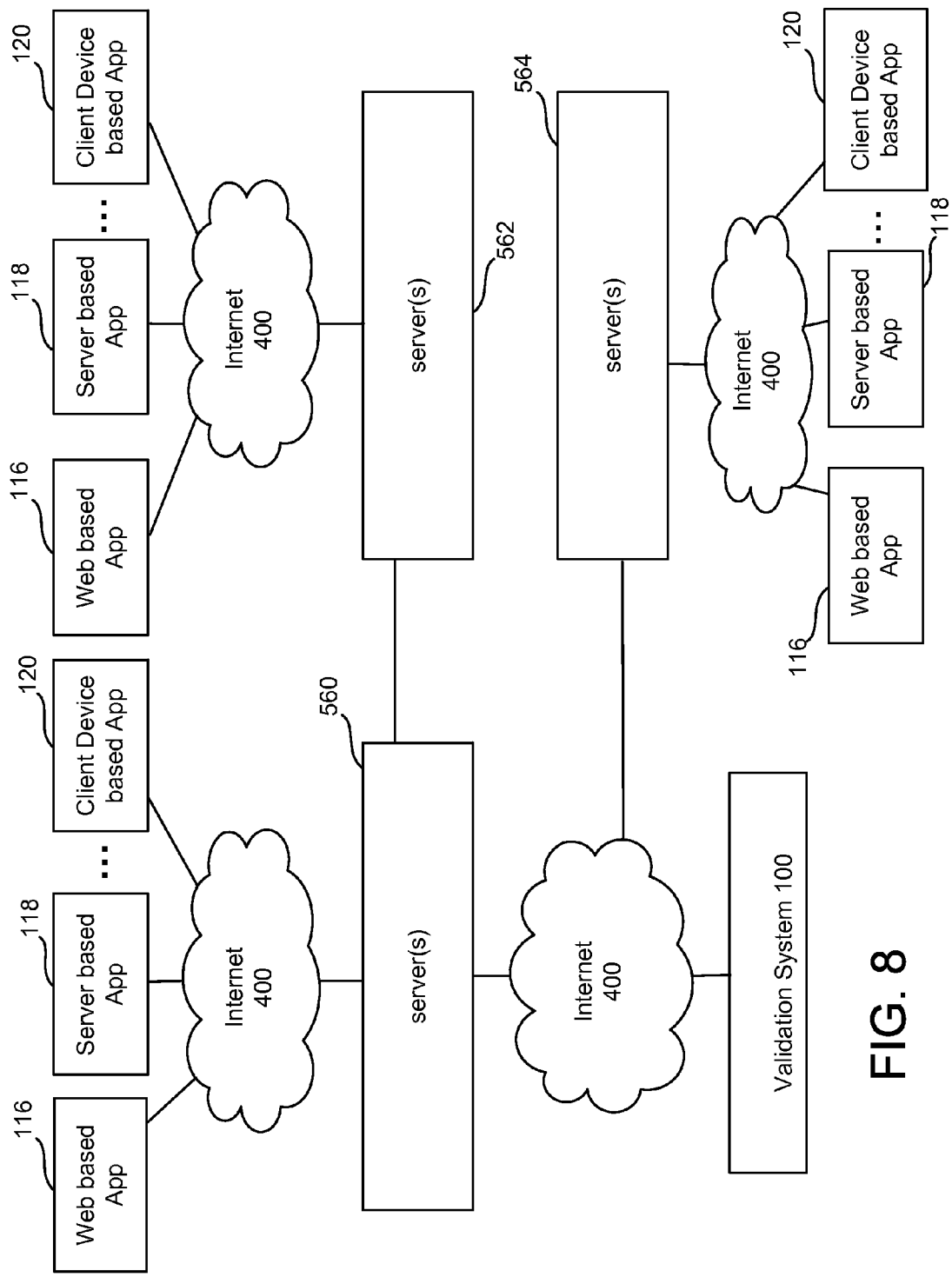
FIG. 8 is a block diagram illustrating an embodiment of a rule-based validation system communicating over the Internet with different applications formatted for different computing environments.

FIG. 8 is a block diagram illustrating a network environment in which an embodiment of a rule-based validation system communicates over the Internet with different applications formatted for different computing environments. As mentioned above, applications like the exemplar web based application 116, an application 118 executing on a server and an application 120 suited to a client device can access the validation system 100 via a network such as the Internet 400. In the depicted examples, servers 562, 564 and 560 are illustrative of the network of servers which make up the Internet and connect applications to the validation system. The decoupling of validation logic from the application which processes data items for validation allows for rules, for example business rules, to change after an application software product has been shipped without having to change or update the software product itself. An update to a centralized rule store instead can update the business rules. Furthermore, rules for more than one type of application product, e.g. different games which execute on the same platform, can also be updated in one centralized location rather than sending specific updates for each type of application.

Figure 9:
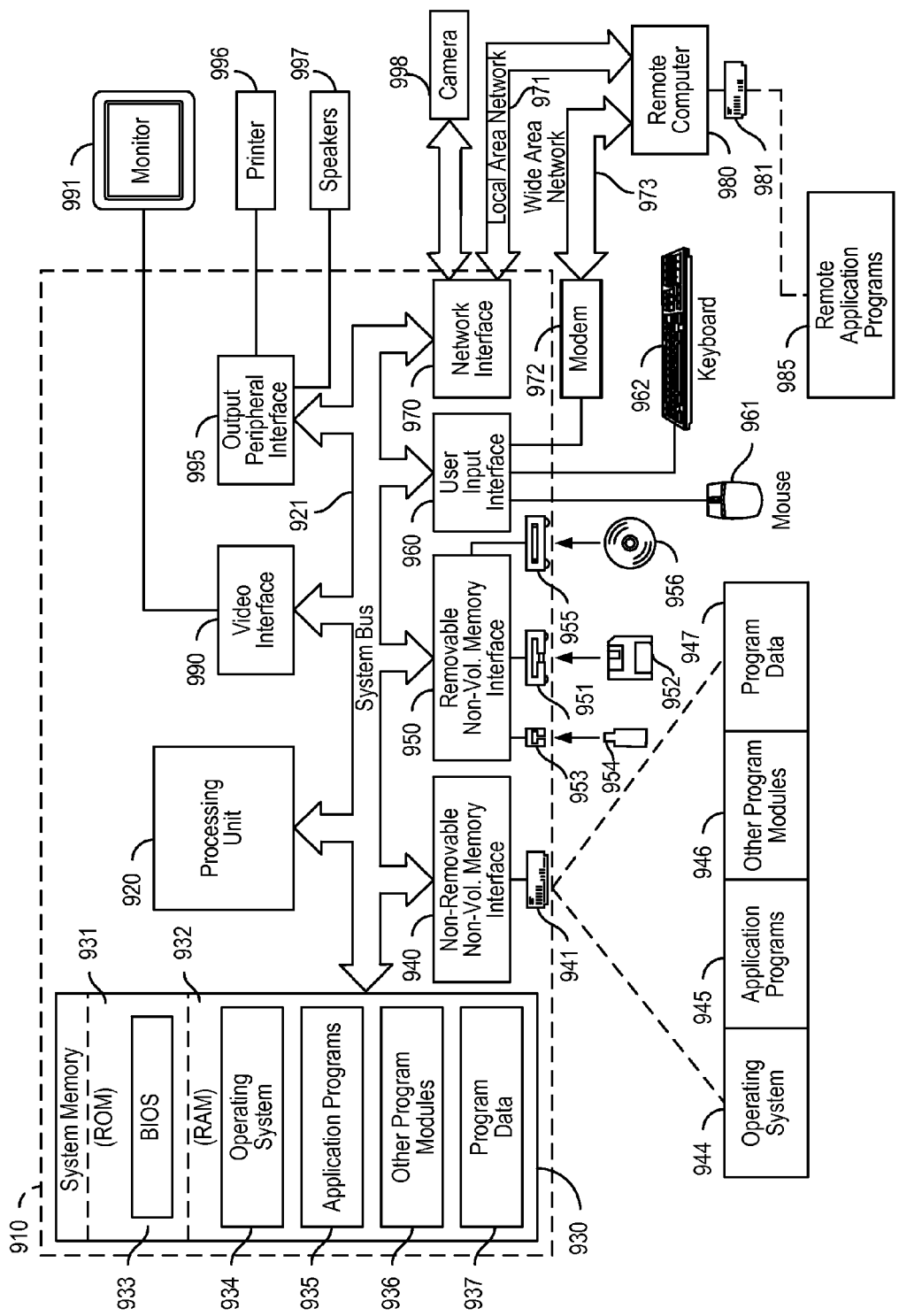
FIG. 9 is a block diagram of an exemplary computing environment including hardware and software components which may implement embodiments of a rule based data driven validation system.

FIG. 9 is a block diagram of an exemplary computing environment including hardware and software components which may implement embodiments of a rule based data driven validation system. FIG. 9 illustrates an example of a general purpose computing system which may be used to implement one or more computer systems used in implementing one or more embodiments of the technology. With reference to FIG. 9, an exemplary system for implementing embodiments of the disclosed technology includes a general purpose computing system in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable storage media. Computer readable media can be any available media that can be accessed by computer 910 and includes both volatile and nonvolatile storage media, removable and non-removable storage media. Computer readable storage media includes volatile and nonvolatile, removable and non-removable memory implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Additionally, FIG. 2B illustrates a removable media drive 953 that reads or writes to a removable memory stick 954 or removable memory card 954. In some examples, the memory card may be a flash memory card or stick. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 20 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 990.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. Another example of a networked device is a camera 998 for providing image data to the computer system 910. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method for rule based data driven validation comprising:
   receiving over a communication network a target data object in a validation request from an executing software application;
   identifying one or more target data member items of the target data object based on stored data type definitions;
   identifying a data type and any inherited data type for the one or more target data member items;
   identifying one or more rules applicable to each target data item based on a target data identifier associated with each applicable rule having a same data type or an inherited data type of the target data item by a rule engine identifying one or more rule instance data items based on the one or more target data items, at least one rule instance data item comprises a condition which is implemented as another rule instance data item accessible by the rule engine like any other rule instance data items, and
   the rule engine identifying one or more rules linked to the identified one or more rule instance data items as the one or more applicable rules;
   in response to determining, via rule execution criteria, the condition of the at least one rule instance data item has been satisfied, as determined by a result of separately executing the another rule instance data item using rule logic decoupled from the software application to determine whether the at least one rule instance data item is to be executed, executing the identified one or more applicable rules after determining that the condition has been satisfied;
   returning a validation result data object to the software application, wherein
   the target data object identifies each target data member item by a class identifier and a property identifier; and
   identifying a data type and any inherited data type for the one or more target data item members comprises determining data types and class membership based on identifying matches with the class identifier and the property identifier for each target data member item and the data type and any inherited data type.

2. The computer implemented method of claim 1 wherein the target data member item is defined to be of a class data type; and
   the inherited data type of the target data member item includes any base class of the class data type.

3. The computer implemented method of claim 1 wherein the target data identifier associated with each applicable rule is the target data identifier in a rule instance data item which links to the respective applicable rule by at least the target data identifier.

4. The computer implemented method of claim 1 wherein the rule execution criteria includes determining whether to skip execution of the applicable rule based on the result from executing the another rule identified as the condition.

5. The computer implemented method of claim 1 wherein the rule execution criteria includes determining whether to alter execution of the applicable rule based on the result from executing the another rule identified as the condition.

6. The computer implemented method of claim 1 wherein executing the identified one or more applicable rules subject to rule execution criteria further comprises locating virtual machine instructions for execution of the one or more applicable rules in one or more files based on a rule identifier associated with each rule.

7. A data driven validation system comprising: one or more processors;
a memory;
an abstract rule store stored in the memory linking one or more rule instance data items to one or more corresponding rules stored in a concrete rule store, each rule instance data item comprising a target data identifier identifying a data type of a target data item processed by its respective linked one or more corresponding rules, and at least one rule instance data item comprises a condition which is implemented as another rule instance data item and an exemption data item, prior to executing a corresponding rule for which the condition has been satisfied, accessible by the rule engine like any other rule instance data item and is attached to the one or more rule instance data items, wherein the another rule is independently executed to determine whether the at least one rule instance data item is to be executed;
a validation software interface executing on the one or more processors for receiving a validation request comprising a target data object from an executing application, the target data object including one or more target data items of the object to be validated;
a rule engine executing on the one or more processors for accessing the one or more rule instance data items communicatively coupled to the validation software interface to receive the validation request;
the rule engine identifies one or more rule instance data items based on the target data identifier which are applicable to the one or more target data items;
the rule engine executes rule logic, which is decoupled from a client device executing the application requesting the validation, and processing the one or more rule instance data items of the corresponding one or more rules linked to the identified one or more rule instance data items, without having to update the application wherein the target data object identifies each target data member item by a class identifier and a property identifier; and
identifying a data type and any inherited data type for the one or more target data item members comprises determining data types and class membership based on identifying matches with the class identifier and the property identifier for each target data member item and the data type and any inherited data type.

8. The system of claim 7, wherein
the rule engine aggregates a validation result value for each rule applied to each target data item of the target data object in a validation result object for the target data object;
based on the validation result values, the rule engine sets an overall validation status for the validation request; and
the validation software interface sends the validation result object to the executing software application.

9. The system of claim 7, further comprising a plurality of concrete rule stores storing rules in a plurality of concrete data formats in the memory.

10. The system of claim 9, wherein the plurality of concrete data formats comprises at least one of the following:
extensible markup language (XML); and
structured query language (SQL).

11. The system of claim 7, wherein
the rule engine executes the rule logic corresponding to the condition implemented as another rule instance for determining whether an exemption action with respect to the corresponding rule is to be applied.

12. The system of claim 7 wherein
each rule instance data item of the abstract rule store comprises a target data identifier including a class identifier and a property identifier;
the rule engine further comprises a rule validator which receives the target data object and each target data item of the object is identifiable by a class identifier and a property identifier; and
the rule validator searches class and property identifiers of rule instance data items for a match.

13. The system of claim 12 further comprising
one or more files including virtual machine instructions for executing rule logic and meta data; and
the rule validator searches the meta data for identifying the rule logic of the corresponding rule.

14. The system of claim 7, wherein the exemption action comprises overriding at least one parameter value of the corresponding rule and executing the corresponding rule using the overridden parameter value.

15. One or more non-transitory computer storage devices having computer-executable instructions embodied thereon that, when executed, facilitate a method for rule based data driven validation, the method comprising:
receiving over a communication network a target data object in a validation request from an executing software application;
identifying one or more target data member items of the target data object based on stored data type definitions;
identifying a data type and any inherited data type for the one or more target data member items;
identifying one or more rules applicable to each target data item based on a target data identifier associated with each applicable rule having a same data type or an inherited data type of the target data item by a rule engine identifying one or more rule instance data items based on the one or more target data items, at least one rule instance data item comprises a condition which is implemented as another rule instance data item accessible by the rule engine like any other rule instance data item, and
the rule engine identifies one or more rules linked to the identified one or more rule instance data items as the one or more applicable rules;
executing the identified one or more applicable rules after rule execution criteria has determined whether the condition has been satisfied based on execution of the another rule instance data item to determine whether the at least one rule instance data item is to be executed, the condition being satisfied when the target data identifier, embedded between condition tags of the at least one rule instance, has a value satisfying the one or more applicable rules;

returning a validation result data object, aggregated for each rule executed for each of the target data items in the target data object, including a validation status to the software application, the validation result data object determined based on execution of the one or more rules stored in a centralized rule store and wherein the validation is decoupled from and performed independently from any application processing the one or more target data items to be validated, wherein the target data object identifies each target data member item by a class identifier and a property identifier; and identifying a data type and any inherited data type for the one or more target data item members comprises determining data types and class membership based on identifying matches with the class identifier and the property identifier for each target data member item and the data type and any inherited data type.

16. The one or more non-transitory computer storage devices of claim 15 wherein the target data member item is defined to be of a class data type; and the inherited data type of the target data member item includes any base class of the class data type.

17. The one or more non-transitory computer storage devices of claim 15 wherein the target data identifier associated with each applicable rule is the target data identifier in a rule instance data item which links to the respective applicable rule by at least the target data identifier.

18. The one or more non-transitory computer storage devices of claim 15 wherein executing the identified one or more applicable rules subject to rule execution criteria further comprises locating virtual machine instructions for execution of the one or more applicable rules in one or more files based on a rule identifier associated with each rule.

\* \* \* \* \*